US010033688B2

(12) United States Patent
Davis et al.

(10) Patent No.: US 10,033,688 B2
(45) Date of Patent: Jul. 24, 2018

(54) SYSTEM AND METHOD FOR CONDITIONAL DELIVERY OF MESSAGES

(71) Applicant: EXCALIBUR IP, LLC, New York, NY (US)

(72) Inventors: Marc Eliot Davis, San Francisco, CA (US); Marco Boerries, Los Altos Hills, CA (US); Christopher Williams Higgins, Portland, OR (US); Joseph James O'Sullivan, Oakland, CA (US); Ronald Martinez, San Francisco, CA (US); Robert Carter Trout, Burlingame, CA (US)

(73) Assignee: EXCALIBUR IP, LLC, New York, NY (US)

( * ) Notice: Subject to any disclaimer, the term of this patent is extended or adjusted under 35 U.S.C. 154(b) by 107 days.

(21) Appl. No.: 14/449,937

(22) Filed: Aug. 1, 2014

(65) Prior Publication Data

US 2014/0344386 A1   Nov. 20, 2014

Related U.S. Application Data

(63) Continuation of application No. 12/236,668, filed on Sep. 24, 2008, now Pat. No. 8,799,371, which is a
(Continued)

(51) Int. Cl.
| | |
|---|---|
| *G06F 15/16* | (2006.01) |
| *H04L 12/58* | (2006.01) |
| *H04W 4/02* | (2018.01) |
| *H04W 4/029* | (2018.01) |
| *H04W 64/00* | (2009.01) |
| *G06Q 10/10* | (2012.01) |
| *H04W 4/21* | (2018.01) |

(52) U.S. Cl.
CPC ........... *H04L 51/34* (2013.01); *G06Q 10/107* (2013.01); *H04L 51/14* (2013.01); *H04L 51/36* (2013.01);
(Continued)

(58) Field of Classification Search
CPC ... G06Q 10/107; H04L 51/14; H04L 12/5855; H04L 51/36; H04L 12/589; H04L 51/00;
(Continued)

(56) References Cited

U.S. PATENT DOCUMENTS

| | | | | |
|---|---|---|---|---|
| 5,493,692 A | * | 2/1996 | Theimer | G06Q 10/107 340/5.74 |
| 6,708,203 B1 | * | 3/2004 | Makar | G06F 3/0489 707/999.006 |

(Continued)

OTHER PUBLICATIONS

U.S. Appl. No. 14/449,937, Davis et al.*

*Primary Examiner* — David R Lazaro
(74) *Attorney, Agent, or Firm* — James J. DeCarlo; Greenberg Traurig, LLP

(57) ABSTRACT

The disclosure describes systems and methods delivering communications associated with delivery conditions in which the occurrence of the delivery condition is determined by monitoring information received from a plurality of sources via multiple communication channels. The message delivery systems allow messages to be delivered to any "Who, What, When, Where" from any "Who, What, When, Where" upon the detection of an occurrence of one or more "Who, What, When, Where" delivery conditions. A message (which may be any data object including text-based messages, audio-based message such as voicemail or other audio such as music or video-based prerecorded messages) is delivered in accordance with delivery conditions based on any available data, including topical, spatial, temporal, and/or social data. Furthermore, because the systems coordinate delivery of messages via multiple communication channels and through multiple devices, the communication channel for delivery of a message may be dynamically determined based on the delivery conditions.

19 Claims, 8 Drawing Sheets

Related U.S. Application Data continuation of application No. 11/953,494, filed on Dec. 10, 2007, now Pat. No. 8,307,029.

(51) Int. Cl.
(52) U.S. Cl.
CPC ............ *H04W 4/02* (2013.01); *H04W 4/023* (2013.01); *H04W 4/029* (2018.02); *H04W 64/00* (2013.01); *H04W 4/21* (2018.02)

(58) Field of Classification Search
CPC ...... H04L 51/34; H04W 4/023; H04W 64/00; H04W 4/02; H04W 4/029; H04W 4/21; H04W 8/005
USPC .................................................. 709/206, 207
See application file for complete search history.

(56) References Cited

U.S. PATENT DOCUMENTS

| | | | |
|---|---|---|---|
| 7,395,507 B2 * | 7/2008 | Robarts | G06Q 10/10 709/206 |
| 8,307,029 B2 * | 11/2012 | Davis | G06Q 10/107 455/26.1 |
| 8,799,371 B2 * | 8/2014 | Davis | G06Q 10/107 709/206 |
| 2003/0078978 A1 * | 4/2003 | Lardin | H04L 29/06 709/206 |
| 2007/0155411 A1 * | 7/2007 | Morrison | H04M 3/493 455/466 |
| 2007/0161382 A1 * | 7/2007 | Melinger | H04L 67/18 455/456.1 |
| 2007/0162569 A1 * | 7/2007 | Robinson | H04L 12/1818 709/219 |
| 2008/0070697 A1 * | 3/2008 | Robinson | A63F 13/12 463/42 |
| 2008/0086261 A1 * | 4/2008 | Robinson | A63F 13/12 701/532 |
| 2008/0086431 A1 * | 4/2008 | Robinson | A63F 13/12 706/11 |
| 2008/0086458 A1 * | 4/2008 | Robinson | A63F 13/12 |
| 2008/0120390 A1 * | 5/2008 | Robinson | A63F 13/12 709/207 |

* cited by examiner

SYSTEM AND METHOD FOR CONDITIONAL DELIVERY OF MESSAGES

CROSS REFERENCE TO RELATED APPLICATIONS

This application is a continuation of, and claims priority from co-pending U.S. patent application Ser. No. 12/236,668, filed Sep. 24, 2008, entitled "SYSTEM AND METHOD FOR CONDITIONAL DELIVERY OF MESSAGES," which is a continuation of U.S. patent application Ser. No. 11/953,494, filed Dec. 10, 2007, now U.S. Pat. No. 8,307,029, entitled "SYSTEM AND METHOD FOR CONDITIONAL DELIVERY OF MESSAGES," which are incorporated herein by reference.

BACKGROUND

A great deal of information is generated when people use electronic devices, such as when people use mobile phones and cable set-top boxes. Such information, such as location, applications used, social network, physical and online locations visited, to name a few, could be used to deliver useful services and information to end users, and provide commercial opportunities to advertisers and retailers. However, most of this information is effectively abandoned due to deficiencies in the way such information may be captured. For example, and with respect to a mobile phone information is generally not gathered while the mobile phone is idle (i.e, not being used by a user). Other information, such as presence of others in the immediate vicinity, time and frequency of messages to other users, and activities of a user's social network are also not captured effectively.

SUMMARY

This disclosure describes systems and methods for using data collected and stored by multiple devices on a network in order to improve the performance of the services provided via the network. In particular, the disclosure describes systems and methods delivering communications associated with delivery conditions in which the occurrence of the delivery condition is determined by monitoring information received from a plurality of sources via multiple communication channels. The message delivery systems allow messages to be delivered to any "Who, What, When, Where" from any "Who, What, When, Where" upon the detection of an occurrence of one or more "Who, What, When. Where" delivery conditions. A message (which may be any data object including text-based messages, audio-based message such as voicemail or other audio such as music or video-based prerecorded messages) is delivered in accordance with delivery conditions based on any available data, including topical, spatial, temporal, and/or social data. Furthermore, because the systems coordinate delivery of messages via multiple communication channels and through multiple devices, the communication channel for delivery of a message may be dynamically determined based on the delivery conditions.

One aspect of the disclosure is a method for delivering messages that includes receiving a request to deliver a first message from a sender to a recipient, such request identifying at least one delivery condition. The method then identifies at least one real world entity (RWE) or information object (IO) associated with the at least one delivery condition. Data associated with each of the identified at least one RWE or IO is then retrieved and monitored for information indicating that the at least one delivery condition is met. The first message is delivered when the at least one delivery condition is met.

Another aspect of the disclosure is a computer-readable medium encoding instructions for performing a method for delivery of a message. The method includes detecting a first message from a sender for delivery to a recipient when a delivery condition is meet and monitoring data associated with at least one RWE related to the delivery condition. The first message is then delivered when the data associated with the at least one RWE indicates that the delivery condition is met. In situations where the delivery condition identifies a first RWE and a range of distances between the recipient and the first RWE, the method may further include identifying a second RWE that is a proxy for a current location of the recipient, periodically retrieving location data describing a current location of the second RWE and a current location of the first RWE and determining the distance between the current location of the second RWE to the current location of the first RWE. In situations where the delivery condition is detection that the recipient is at an event associated with an event location and an event time period the method may include identifying a mobile device that is a proxy for a current location of the recipient, the mobile device being the at least one RWE, retrieving location data describing a current location of the mobile device during the event time period, and determining a current distance between the current location of the mobile device and the event location. In situations where the delivery condition is detection that the recipient is at an event associated with an event location and an event time period, the method may include identifying a mobile device that is a proxy for a current location of the recipient, the mobile device being the at least one RWE, retrieving location data describing a current location of the mobile device during the event time period, and determining a current distance between the current location of the mobile device and the event location.

In yet another aspect, the disclosure describes a system that includes a data collection engine connected via at least one communication channel to a plurality of computing devices transmitting IOs over the at least one communication channel. The system further includes computer-readable media connected to the data collection engine storing at least one of social data, spatial data temporal data and logical data associated with a plurality of RWEs including the plurality of computing devices, such social data, spatial data, temporal data and logical data collected by the data collection engine from the IOs transmitted by the plurality of computing devices. The system further includes a message delivery engine that, based on the detection of a request to deliver a message to a recipient when a delivery condition is met, identifies a first set of one or more of the plurality of RWEs as associated with the delivery condition and tests the data from the computer-readable medium for the identified one or more of the plurality of RWEs for occurrence of the delivery condition.

These and various other features as well as advantages will be apparent from a reading of the following detailed description and a review of the associated drawings. Additional features are set forth in the description that follows and, in part, will be apparent from the description, or may be learned by practice of the described embodiments. The benefits and features will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The following drawing figures, which form a part of this application, are illustrative of embodiments systems and methods described below and are not meant to limit the scope of the disclosure in any manner, which scope shall be based on the claims appended hereto.

DETAILED DESCRIPTION

Figure 1:
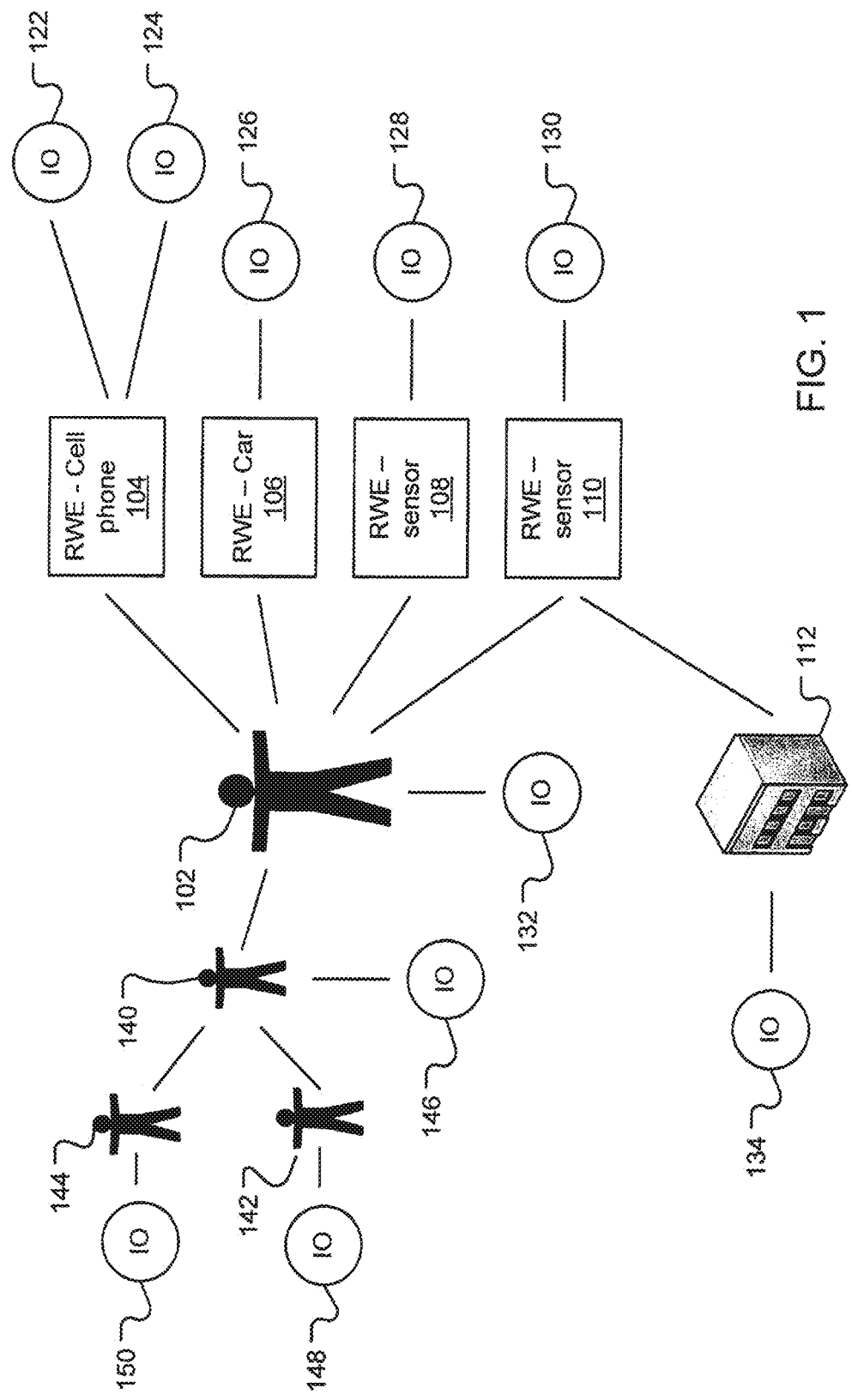
FIG. 1 illustrates an example of the relationships between RWEs and IOs on the W4 COMN.

This disclosure describes a communication network, referred herein as the "W4 Communications Network" or W4 COMN, that uses information related to the "Who, What, When and Where" of interactions with the network to provide improved services to the network's users. The W4 COMN is a collection of users, devices and processes that foster both synchronous and asynchronous communications between users and their proxies. It includes an instrumented network of sensors providing data recognition and collection in real-world environments about any subject, location, user or combination thereof.

As a communication network, the W4 COMN handles the routing/addressing, scheduling, filtering, prioritization, replying, forwarding, storing, deleting, privacy, transacting, triggering of a new message, propagating changes, transcoding and linking. Furthermore, these actions can be performed on any communication channel accessible by the W4 COMN.

The W4 COMN uses a data modeling strategy for creating profiles for not only users and locations but also any device on the network and any kind of user-defined data with user-specified conditions from a rich set of possibilities. Using Social, Spatial, Temporal and Logical data available about a specific user, topic or logical data object, every entity known to the W4 COMN can be mapped and represented against all other known entities and data objects in order to create both a micro graph for every entity as well as a global graph that interrelates all known entities against each other and their attributed relations.

In order to describe the operation of the W4 COMN, two elements upon which the W4 COMN is built must first be introduced, real-world entities and information objects. These distinction are made in order to enable correlations to be made from which relationships between electronic/logical objects and real objects can be determined. A real-world entity (RWE) refers to a person, device, location, or other physical thing known to the W4 COMN. Each RWE known to the W4 COMN is assigned or otherwise provided with a unique W4 identification number that absolutely identifies the RWE within the W4 COMN.

RWEs may interact with the network directly or through proxies, which may themselves be RWEs. Examples of RWEs that interact directly with the W4 COMN include any device such as a sensor, motor, or other piece of hardware that connects to the W4 COMN in order to receive or transmit data or control signals. Because the W4 COMN can be adapted to use any and all types of data communication, the devices that may be RWEs include all devices that can serve as network nodes or generate, request and/or consume data in a networked environment or that can be controlled via the network. Such devices include any kind of "dumb" device purpose-designed to interact with a network (e.g., cell phones, cable television set top boxes, fax machines, telephones, and radio frequency identification (RFID) tags, sensors, etc.). Typically, such devices are primarily hardware and their operations can not be considered separately from the physical device.

Examples of RWEs that must use proxies to interact with W4 COMN network include all non-electronic entities including physical entities, such as people, locations (e.g., states, cities, houses, buildings, airports, roads, etc.) and things (e.g. animals, pets, livestock, gardens, physical objects, cars, airplanes, works of art, etc.), and intangible entities such as business entities, legal entities, groups of people or sports teams. In addition, "smart" devices (e.g., computing devices such as smart phones, smart set top boxes, smart cars that support communication with other devices or networks, laptop computers, personal computers, server computers, satellites, etc.) are also considered RWEs that must use proxies to interact with the network. Smart devices are electronic devices that can execute software via an internal processor in order to interact with a network. For smart devices, it is actually the executing software application(s) that interact with the W4 COMN and serve as the devices' proxies.

The W4 COMN allows associations between RWEs to be determined and tracked. For example, a given user (an RWE) may be associated with any number and type of other RWEs including other people, cell phones, smart credit cards, personal data assistants, email and other communication service accounts, networked computers, smart appliances, set top boxes and receivers for cable television and other media services, and any other networked device. This association may be made explicitly by the user, such as when the RWE is installed into the W4 COMN. An example of this is the set up of a new cell phone, cable television service or email account in which a user explicitly identifies an RWE (e.g., the user's phone for the cell phone service, the user's set top box and/or a location for cable service, or a username and password for the online service) as being directly associated with the user. This explicit association may include the user identifying a specific relationship between the user and the RWE (e.g., this is my device, this is my home appliance, this person is my friend/father/son/etc., this device is shared between me and other users, etc.). RWEs may also be implicitly associated with a user based on a current situation. For example, a weather sensor on the W4 COMN may be implicitly associated with a user based on information indicating that the user lives or is passing near the sensor's location.

An information object (IO), on the other hand, is a logical object that stores, maintains, generates, serves as a source for or otherwise provides data for use by RWEs and/or the W4 COMN. IOs are distinct from RWEs in that IOs represent data, whereas RWEs may create or consume data (often by creating or consuming IOs during their interaction with the W4 COMN. Examples of IOs include passive objects such as communication signals (e.g., digital and analog telephone signals, streaming media and interprocess communications), email messages, transaction records, virtual cards, event records (e.g., a data file identifying a time, possibly in combination with one or more RWEs such as users and locations, that may further be associated with a known topic/activity/significance such as a concert, rally, meeting, sporting event, etc.), recordings of phone calls, calendar entries, web pages, database entries, electronic media objects (e.g., media files containing songs, videos, pictures, images, audio messages, phone calls, etc.), electronic files and associated metadata.

In addition, IOs include any executing process or application that consumes or generates data such as an email communication application (such as OUTLOOK by MICROSOFT, or YAHOO!MAIL by YAHOO!), a calendaring application, a word processing application, an image editing application, a media player application, a weather monitoring application, a browser application and a web page server application. Such active IOs may or may not serve as a proxy for one or more RWEs. For example, voice communication software on a smart phone may serve as the proxy for both the smart phone and for the owner of the smart phone.

An IO in the W4 COMN may be provided a unique W4 identification number that absolutely identifies the IO within the W4 COMN. Although data in an IO may be revised by the act of an RWE, the IO remains a passive, logical data representation or data source and, thus, is not an RWE For every IO there are at least three classes of associated RWEs. The first is the RWE who owns or controls the IO, whether as the creator or a rights holder (e.g. an RWE with editing rights or use rights to the 10). The second is the RWE(s) that the IO relates to, for example by containing information about the RWE or that identifies the RWE. The third are any RWEs who then pay any attention (directly or through a proxy process) to the IO, in which "paying attention" refers to accessing the IO in order to obtain data from the IO for some purpose.

"Available data" and "W4 data" means data that exists in an IO in some form somewhere or data that can be collected as needed from a known IO or RWE such as a deployed sensor. "Sensor" means any source of W4 data including PCs, phones, portable PCs or other wireless devices, household devices, cars, appliances, security scanners, video surveillance, RFID tags in clothes, products and locations, online data or any other source of information about a real-world user/topic/thing (RWE) or logic-based agent/process/topic/thing (IO).

FIG. 1 illustrates an example of the relationships between RWEs and IOs on the W4 COMN. In the embodiment illustrated, a user 102 is a RWE of the network provided with a unique network ID. The user 102 is a human that communicates with the network via the proxy devices 104, 106, 108, 110 associated with the user 102, all of which are RWEs of the network and provided with their own unique network ID. Some of these proxies may communicate directly with the W4 COMN or may communicate with the W4 COMN via IOs such as applications executed on or by the device.

As mentioned above the proxy devices 104, 106, 108, 110 may be explicitly associated with the user 102. For example, one device 104 may be a smart phone connected by a cellular service provider to the network and another device 106 may be a smart vehicle that is connected to the network. Other devices may be implicitly associated with the user 102. For example, one device 108 may be a "dumb" weather sensor at a location matching the current location of the user's cell phone 104, and thus implicitly associated with the user 102 while the two RWEs 104, 108 are co-located. Another implicitly associated device 110 may be a sensor 110 for physical location 112 known to the W4 COMN. The location 112 is known, either explicitly (through a user-designated relationship, e.g., this is my home, place of employment, parent, etc.) or implicitly (the user 102 is often co-located with the RWE 112 as evidenced by data from the sensor 110 at that location 112), to be associated with the first user 102.

The user 102 may also be directly associated with other people, such as the person 140 shown, and then indirectly associated with other people 142, 144 through their associations as shown. Again, such associations may be explicit (e.g, the user 102 may have identified the associated person 140 as his/her father, or may have identified the person 140 as a member of the user's social network) or implicit (e.g., they share the same address).

Tracking the associations between people (and other RWEs as well) allows the creation of the concept of "intimacy": Intimacy being a measure of the degree of association between two people or RWEs. For example, each degree of removal between RWEs may be considered a lower level of intimacy, and assigned lower intimacy score. Intimacy may be based solely on explicit social data or may be expanded to include all W4 data including spatial data and temporal data.

Each RWE 102, 104, 106, 108, 110, 112, 140, 142, 144 of the W4 COMN may be associated with one or more IOs as shown. Continuing the examples discussed above, FIG. 1 illustrates two IOs 122, 124 as associated with the cell phone device 104. One IO 122 may be a passive data object such as an event record that is used by scheduling/calendaring software on the cell phone, a contact IO used by an address book application, a historical record of a transaction made using the device 104 or a copy of a message sent from the device 104. The other IO 124 may be an active software process or application that serves as the device's proxy to the W4 COMN by transmitting or receiving data via the W4 COMN. Voice communication software, scheduling/calendaring software, an address book application or a text messaging application are all examples of IOs that may communicate with other IOs and RWEs on the network. The IOs 122, 124 may be locally stored on the device 104 or stored remotely on some node or datastore accessible to the W4 COMN, such as a message server or cell phone service datacenter. The IO 126 associated with the vehicle 108 may be an electronic file containing the specifications and/or current status of the vehicle 108, such as make, model, identification number, current location, current speed, current condition, current owner, etc. The IO 128 associated with sensor 108 may identify the current state of the subject(s) monitored by the sensor 108, such as current weather or current traffic. The IO 130 associated with the cell phone 110 may be information in a database identifying recent calls or the amount of charges on the current bill.

Furthermore, those RWEs which can only interact with the W4 COMN through proxies, such as the people 102, 140, 142, 144, computing devices 104, 106 and location 112, may have one or more IOs 132, 134, 146, 148, 150 directly associated with them. An example includes IOs 132, 134 that contain contact and other RWE-specific information. For example, a person's IO 132, 146, 148, 150 may be a user profile containing email addresses, telephone numbers, physical addresses, user preferences, identification of devices and other RWEs associated with the user, records of the user's past interactions with other RWE's on the W4 COMN (e.g., transaction records, copies of messages, listings of time and location combinations recording the user's whereabouts m the past), the unique W4 COMN identifier for the location and/or any relationship information (e.g., explicit user-designations of the user's relationships with relatives, employers, co-workers, neighbors, service providers, etc.). Another example of a person's IO 132, 146, 148, 150 includes remote applications through which a person can communicate with the W4 COMN such as an account with a web-based email service such as Yahoo! Mail. The location's IO 134 may contain information such as the exact coordinates of the location, driving directions to the location, a classification of the location (residence, place of business, public, non-public, etc.), information about the services or products that can be obtained at the location, the unique W4 COMN identifier for the location, businesses located at the location, photographs of the location, etc.

In order to correlate RWEs and IOs to identify relationships, the W4 COMN makes extensive use of existing metadata and generates additional metadata where necessary. Metadata is loosely defined as data that describes data. For example, given an IO such as a music file, the core, primary or object data of the music file is the actual music data that is converted by a media player into audio that is heard by the listener. Metadata for the same music file may include data identifying the artist, song, etc., album art, and the format of the music data. This metadata may be stored as part of the music file or in one or more different IOs that are associated with the music file or both. In addition. W4 metadata for the same music file may include the owner of the music file and the rights the owner has in the music file. As another example if the IO is a picture taken by an electronic camera, the picture may include in addition to the primary image data from which an image may be created on a display, metadata identifying when the picture was taken, where the camera was when the picture was taken, what camera took the picture, who, if anyone, is associated (e.g., designated as the camera's owner) with the camera, and who and what are the subjects of/in the picture. The W4 COMN uses all the available metadata in order to identify implicit and explicit associations between entities and data objects.

Figure 2:
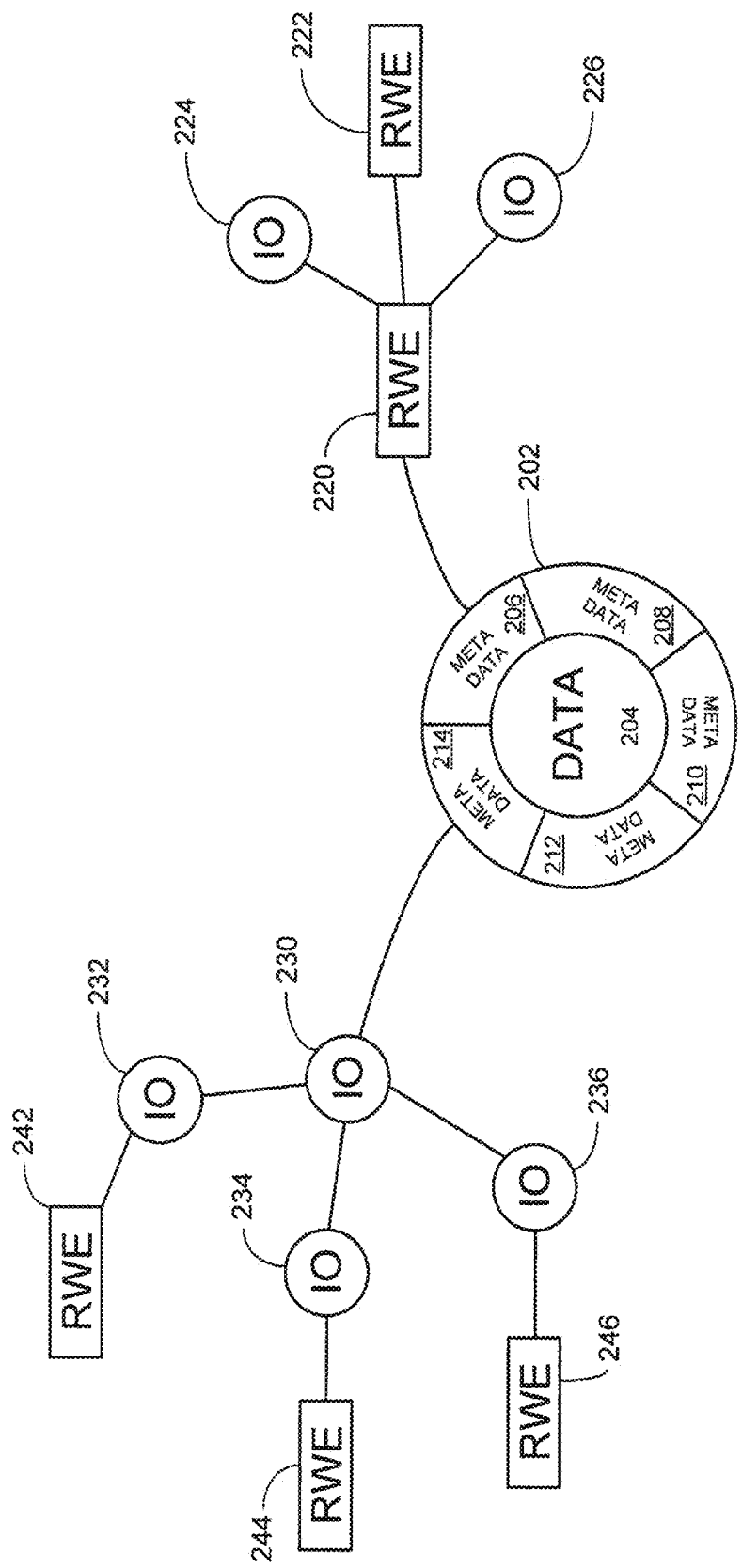
FIG. 2 illustrates an example of metadata defining the relationships between RWEs and IOs on the W4 COMN.

FIG. 2 illustrates an example of metadata defining the relationships between RWEs and IOs on the W4 COMN. In the embodiment shown, an IO 202 includes object data 204 and live discrete items of metadata 206, 208, 210, 212, 214. Some items of metadata 208, 210, 212 may contain information related only to the object data 204 and unrelated to any other IO or RWE. For example, a creation date, text or an image that is to be associated with the object data 204 of the IO 202.

Some of items of metadata 206, 214, on the other hand, may identify relationships between the IO 202 and other RWEs and IOs. As illustrated, the IO 202 is associated by one item of metadata 206 with an RWE 220 that RWE 220 is further associated with two IOs 224, 226 and a second RWE 222 based on some information known to the W4 COMN. This part of FIG. 2, for example, could describe the relations between a picture (IO 202) containing metadata 206 that identifies the electronic camera (the first RWE 220) and the user (the second RWE 224) that is known by the system to be the owner of the camera 220. Such ownership information may be determined, for example, from one or another of the IOs 224, 226 associated with the camera 220.

FIG. 2 also illustrates metadata 214 that associates the IO 202 with another IO 230. This IO 230 is itself associated with three other IOs 232, 234, 236 that are further associated with different RWEs 242, 244, 246. This part of FIG. 2, for example, could describe the relations between a music file (IO 202) containing metadata 206 that identifies the digital rights file (the first IO 230) that defines the scope of the rights of use associated with this music file 202. The other IOs 232, 234, 236 are other music files that are associated with the rights of use and which are currently associated with specific owners (RWEs 242, 244, 246).

Figure 3:
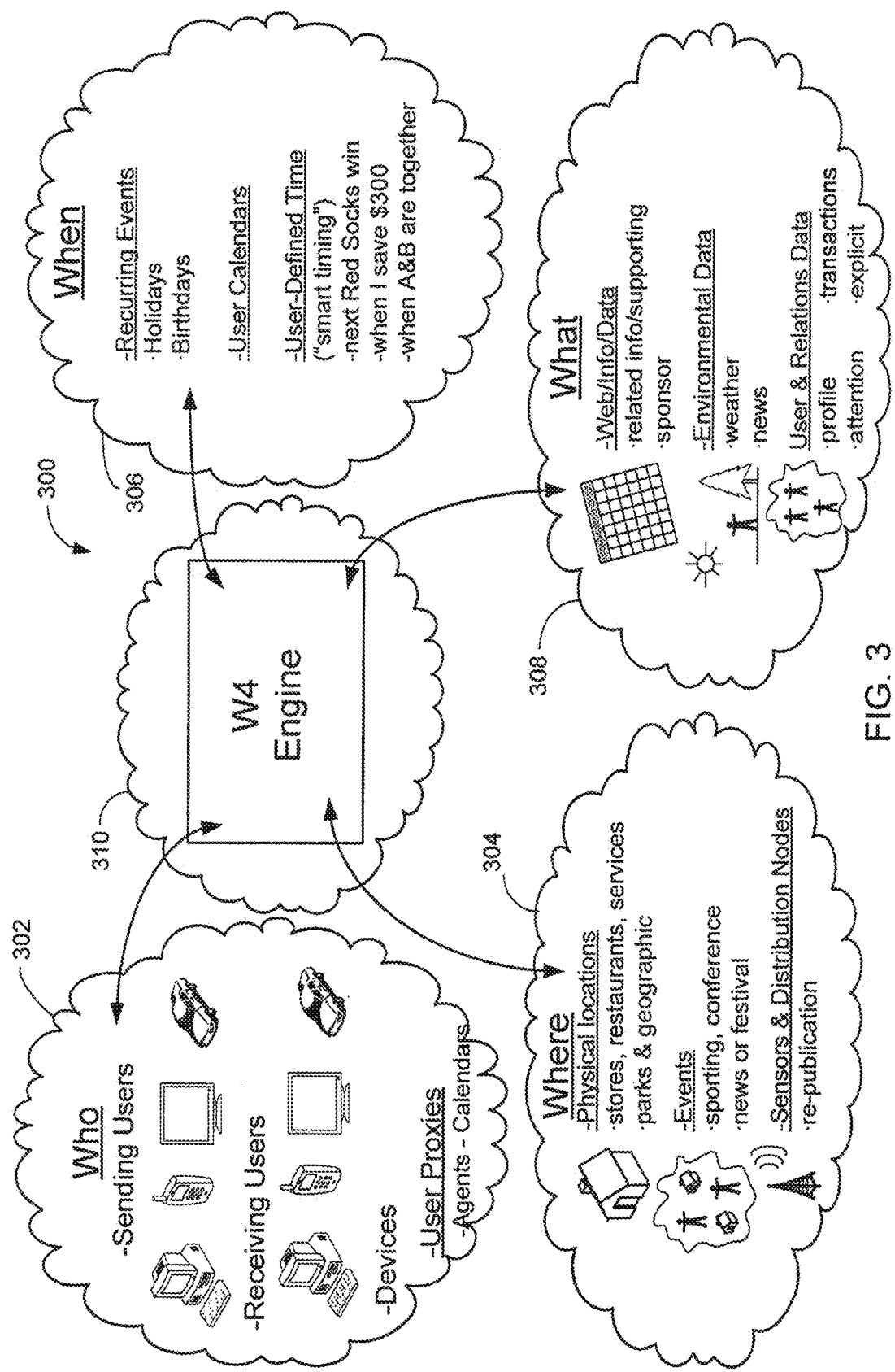
FIG. 3 illustrates a conceptual model of the W4 COMN

FIG. 3 illustrates a conceptual model of the W4 COMN. The W4 COMN 300 creates an instrumented messaging infrastructure in the form of a global logical network cloud conceptually sub-divided into networked-clouds for each of the 4Ws: Who, Where, What and When. In the Who cloud 302 are all users whether acting as senders, receivers, data points or confirmation/certification sources as well as user proxies in the forms of user-program processes, devices, agents, calendars, etc. In the Where cloud 304 are all physical locations, events, sensors or other RWEs associated with a spatial reference point or location. The When cloud 306 is composed of natural temporal events (that is events that are not associated with particular location or person such as days, times, seasons) as well as collective user temporal events (holidays, anniversaries, elections, etc.) and user-defined temporal events (birthdays, smart-timing programs). The What cloud 308 is comprised of all known data—web or private, commercial or user—accessible to the W4 COMN, including for example environmental data like weather and news, RWE-generated data, IOs and IO data, user data, models, processes and applications. Thus, conceptually, most data is contained in the What cloud 308.

As this is just a conceptual model, it should be noted that some entities, sensors or data will naturally exist in multiple clouds either disparate in time or simultaneously. Additionally, some IOs and RWEs may be composites in that they combine elements from one or more clouds. Such composites may be classified or not as appropriate to facilitate the determination of associations between RWEs and IOs. For example, an event consisting of a location and time could be equally classified within the When cloud 306, the What cloud 308 and/or the Where cloud 304.

The W4 engine 310 is center of the W4 COMN's central intelligence for making all decisions in the W4 COMN. An "engine" as referred to herein is meant to describe a software, hardware or firmware (or combinations thereof) system, process or functionality that performs or facilitates the processes, features and/or functions described herein (with or without human interaction or augmentation). The W4 engine 310 controls all interactions between each layer of the W4 COMN and is responsible for executing any approved user or application objective enabled by W4 COMN operations or interoperating applications. In an embodiment, the W4 COMN is an open platform upon which anyone can write an application. To support this, it includes standard published APIs for requesting (among other things) synchronization, disambiguation, user or topic addressing, access rights, prioritization or other value-based ranking, smart scheduling, automation and topical, social, spatial or temporal alerts.

One function of the W4 COMN is to collect data concerning all communications and interactions conducted via the W4 COMN, which may include storing copies of IOs and information identifying all RWEs and other information related to the IOs (e.g. who, what, when, where information). Other data collected by the W4 COMN may include information about the status of any given RWE and IO at any given time, such as the location, operational state, monitored conditions (e.g., for an RWE that is a weather sensor, the current weather conditions being monitored or for an RWE that is a cell phone, its current location based on the cellular towers it is in contact with) and current status.

The W4 engine 310 is also responsible for identifying RWEs and relationships between RWEs and IOs from the data and communication streams passing through the W4 COMN. The function of identifying RWEs associated with or implicated by IOs and actions performed by other RWEs is referred to as entity extraction. Entity extraction includes both simple actions, such as identifying the sender and receivers of a particular IO, and more complicated analyses of the data collected by and/or available to the W4 COMN, for example determining that a message listed the time and location of an upcoming event and associating that event with the sender and receiver(s) of the message based on the context of the message or determining that an RWE is stuck in a traffic jam based on a correlation of the RWE's location with the status of a co-located traffic monitor.

It should be noted that when performing entity extraction from an IO, the IO can be an opaque object with only W4 metadata related to the object (e.g., date of creation, owner, recipient, transmitting and receiving RWEs, type of IO, etc.), but no knowledge of the internals of the IO (i.e. the actual primary or object data contained within the object). Knowing the content of the IO does not prevent W4 data about the IO (or RWE) to be gathered. The content of the IO if known can also be used in entity extraction, if available, but regardless of the data available entity extraction is performed by the network based on the available data. Likewise, W4 data extracted around the object can be used to imply attributes about the object itself while in other embodiments, full access to the IO is possible and RWEs can thus also be extracted by analyzing the content of the object, e.g. strings within an email are extracted and associated as RWEs to for use in determining the relationships between the sender, user, topic or other RWE or IO impacted by the object or process.

In an embodiment, the W4 engine 310 represents a group of applications executing on one or more computing devices that are nodes of the W4 COMN. For the purposes of this disclosure, a computing device is a device that includes a processor and memory for storing data and executing software (e.g., applications) that perform the functions described. Computing devices may be provided with operating systems that allow the execution of software applications in order to manipulate data.

In the embodiment shown, the W4 engine 310 may be one or a group of distributed computing devices, such as a general-purpose personal computers (PCs) or purpose built server computers, connected to the W4 COMN by suitable communication hardware and/or software. Such computing devices may be a single device or a group of devices acting together. Computing devices may be provided with any number of program modules and data files stored in a local or remote mass storage device and local memory (e.g., RAM) of the computing device. For example, as mentioned above, a computing device may include an operating system suitable for controlling the operation of a networked computer, such as the WINDOWS XP or WINDOWS SERVER operating systems from MICROSOFT CORPORATION.

Some RWEs may also be computing devices such as smart phones, web-enabled appliances, PCs, laptop computers, and personal data assistants (PDAs). Computing devices may be connected to one or more communications networks such as the Internet, a publicly switched telephone network, a cellular telephone network, a satellite communication network, a wired communication network such as a cable television or private area network. Computing devices may be connected any such network via a wired data connection or wireless connection such as a wi-fi, a WiMAX (802.36), a Bluetooth or a cellular telephone connection.

Local data structures, including discrete IOs, may be stored on a mass storage device (not shown) that is connected to, or part of, any of the computing devices described herein including the W4 engine 310. For example, in an embodiment, the data backbone of the W4 COMN, discussed below, includes multiple mass storage devices that maintain the IOs, metadata and data necessary to determine relationships between RWEs and IOs as described herein. A mass storage device includes some form of computer-readable media and provides non-volatile storage of data and software for retrieval and later use by one or more computing devices. Although the description of computer-readable media contained herein refers to a mass storage device, such as a hard disk or CD-ROM drive, it should be appreciated by those skilled in the art that computer-readable media can be any available media that can be accessed by a computing device.

By way of example, and not limitation, computer-readable media may comprise computer storage media and communication media. Computer storage media include volatile and non-volatile, removable and non-removable media implemented in any method or technology for storage of information such as computer-readable instructions, data structures, program modules or other data Computer storage media includes, but is not limited to, RAM, ROM, EPROM, EEPROM, flash memory or other solid state memory technology, CD-ROM, DVD, or other optical storage, magnetic cassette, magnetic tape, magnetic disk storage or other magnetic storage devices, or any other medium which can be used to store the desired information and which can be accessed by the computer.

Figure 4:
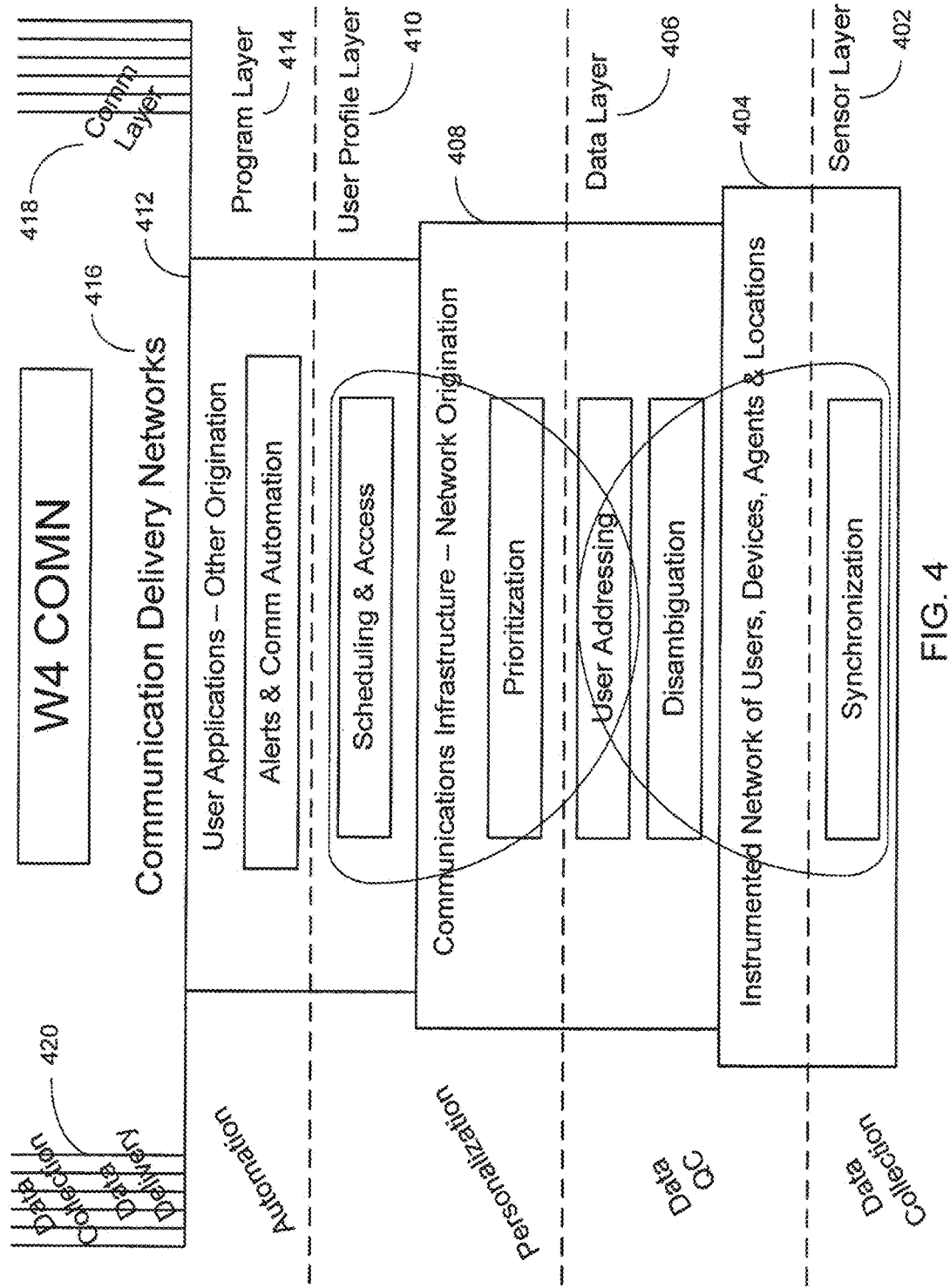
FIG. 4 illustrates the functional layers of the W4 COMN architecture.

FIG. 4 illustrates the functional layers of the W4 COMN architecture. At the lowest layer, referred to as the sensor layer 402, is the network 404 of the actual devices, users, nodes and other RWEs. The instrumentation of the network nodes to utilize them as sensors include known technologies like web analytics, GPS, cell-tower pings, use logs, credit card transactions, online purchases, explicit user profiles and implicit user profiling achieved through behavioral targeting, search analysis and other analytics models used to optimize specific network applications or functions.

The next layer is the data layer 406 in which the data produced by the sensor layer 402 is stored and cataloged. The data may be managed by either the network 404 of sensors or the network infrastructure 406 that is built on top of the instrumented network of users, devices, agents, locations, processes and sensors. The network infrastructure 408 is the core under-the-covers network infrastructure that includes the hardware and software necessary to receive that transmit data from the sensors, devices, etc. of the network 404. It further includes the processing and storage capability necessary to meaningfully categorize and track the data created by the network 404.

The next layer of the W4 COMN is the user profiling layer 410. This layer 410 may further be distributed between the network infrastructure 408 and user applications/processes 412 executing on the W4 engine or disparate user computing devices. In the user profiling layer 410 that functions as W4 COMN's user profiling layer 410. Personalization is enabled across any single or combination of communication channels and modes including email, IM, texting (SMS, etc.), photobloging, audio (e.g. telephone call), video (teleconferencing, live broadcast), games, data confidence processes, security, certification or any other W4 COMN process call for available data.

In one embodiment, the user profiling layer 410 is a logic-based layer above all sensors to which sensor data are sent in the rawest form to be mapped and placed into the W4 COMN data backbone 420. The data (collected and refined, related and deduplicated, synchronized and disambiguated) are then stored in one or a collection of related databases available to all processes of all applications approved on the W4 COMN. All Network-originating actions and communications are based upon the fields of the data backbone, and some of these actions are such that they themselves become records somewhere in the backbone, e.g. invoicing, while others. e.g. fraud detection, synchronization, disambiguation, can be done without an impact to profiles and models within the backbone.

Actions originating from anything other than the network, e.g., RWEs such as users, locations, proxies and processes, come from the applications layer 414 of the W4 COMN. Some applications may be developed by the W4 COMN operator and appear to be implemented as part of the communications infrastructure 408, e.g. email or calendar programs because of how closely the operate with the sensor processing and user profiling layer 410. The applications 412 also serve some role as a sensor in that they, through their actions, generate data back to the data layer 406 via the data backbone concerning any data created or available due to the applications execution.

The applications layer 414 also provides a personalized user interface (UI) based upon device, network, carrier as well as user-selected or security-based customizations. Any UI can operate within the W4 COMN if it is instrumented to provide data on user interactions or actions back to the network. This is a basic sensor function of any W4 COMN application/UI, and although the W4 COMN can interoperate with applications/UIs that are not instrumented, it is only in a delivery capacity and those applications/UIs would not be able to provide any data (let alone the rich data otherwise available from W4-enabled devices.)

In the case of W4 COMN mobile devices, the UI can also be used to confirm or disambiguate incomplete W4 data in real-time, as well as correlation, triangulation and synchronization sensors for other nearby enabled or non-enabled devices. At some point, the network effects of enough enabled devices allow the network to gather complete or nearly complete data (sufficient for profiling and tracking) of a non-enabled device because of it's regular intersection and sensing by enabled devices in it's real-world location.

Above the applications layer 414 (and sometimes hosted within it) is the communications delivery network(s) 416. This can be operated by the W4 COMN operator or be independent third-party carrier service, but in either case it functions to deliver the data via synchronous or asynchronous communication. In every case, the communication delivery network 414 will be sending or receiving data (e.g., http or IP packets) on behalf of a specific application or network infrastructure 408 request.

The communication delivery layer 418 also has elements that act as sensors including W4 entity extraction from telephone calls, emails, blogs, etc. as well as specific user commands within the delivery network context, e.g., "save and prioritize this call" said before end of call may trigger a recording of the previous conversation to be saved and for the W4 entities within the conversation to analyzed and increased in weighting prioritization decisions in the personalization/user profiling layer 410.

Figure 5:
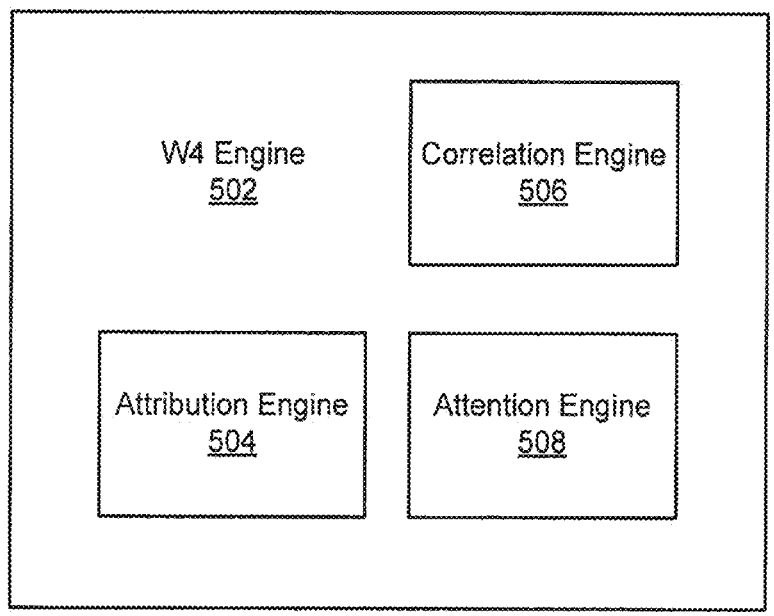
FIG. 5 illustrates an embodiment of analysis components of a W4 engine as shown in FIG. 2.

FIG. 5 illustrates an embodiment of analysis components of a W4 engine as shown in FIG. 3. As discussed above, the W4 Engine is responsible for identifying RWEs and relationships between RWEs and IOs from the data and communication streams passing through the W4 COMN.

In one embodiment the W4 engine connects, interoperates and instruments all network participants through a series of sub-engines that perform different operations in the entity extraction process. One such sub-engine is an attribution engine 504. The attribution engine 504 tracks the real-world ownership, control, publishing or other conditional rights of any RWE in any IO. Whenever a new IO is detected by the W4 engine 502. e.g., through creation or transmission of a new message, a new transaction record, a new image file, etc, ownership is assigned to the IO. The attribution engine 504 creates this ownership information and further allows this information to be determined for each IO known to the W4 COMN.

The W4 engine 502 further includes a correlation engine 506. The correlation engine 506 operates in two capacities: first, to identify associated RWEs and IOs and their relationships (such as by creating a combined graph of any combination of RWEs and IOs and their attributes, relationships and reputations within contexts or situations) and second, as a sensor analytics pre-processor for attention events from any internal or external source.

In one embodiment, the identification of associated RWEs and IOs function of the correlation engine 506 is done by graphing the available data. In this embodiment, a histogram of all RWEs and IOs is created, from which correlations based on the graph may be made. Graphing, or the act of creating a histogram, is a computer science method of identify a distribution of data in order to identify relevant information and make correlations between the data. In a more general mathematical sense, a histogram is simply a mapping m, that counts the number of observations that fall into various disjoint categories (known as bins), whereas the graph of a histogram is merely one way to represent a histogram By selecting each IO, RWE, and other known parameters (e.g., times, dates, locations, etc.) as different bins and mapping the available data, relationships between RWEs, IOs and the other parameters can be identified.

In an embodiment, the W4 data are processed and analyzed using data models that treat data not as abstract signals stored in databases, but rather as IOs that represent RWEs that actually exist, have existed, or will exist in real space, real time, and are real people, objects, places, times, and/or events. As such, the data model for W4 IOs that represent W4 RWEs (Where/When/Who/What) will model not only the signals recorded from the RWEs or about the RWEs, but also represent these RWEs and their interactions in ways that model the affordances and constraints of entitles and activities in the physical world. A notable aspect is the modeling of data about RWEs as embodied and situated in real world contexts so that the computation of similarity, clustering, distance, and inference take into account the states and actions of RWEs in the real world and the contexts and patterns of these states and actions.

For example, for temporal data the computation of temporal distance and similarity in a W4 data model cannot merely treat time as a linear function. The temporal distance and similarity between two times is dependent not only on the absolute linear temporal delta between them (e.g., the number of hours between "Tuesday, November 20, 4:00 pm Pacific Time" and "Tuesday, November 20, 7:00 pm Pacific Time"), but even more so is dependent on the context and activities that condition the significance of these times in the physical world and the other W4 RWEs (people, places, objects, and events) etc.) associated with them. For example, in terms of distance and similarity, "Tuesday, November 20, 4:00 pm Pacific Time" and "Tuesday, November 27, 4:00 pm Pacific Time" may be modeled as closer together in a W4 temporal data model than "Tuesday. November 20, 4.00 pm Pacific Time" and "Tuesday. November 20, 7:00 pm Pacific Time" because of the weekly meeting that happens every Tuesday at work at 4:00 pm vs. the dinner at home with family that happens at 7 pm on Tuesdays. Contextual and periodic patterns in time may be important to the modeling of temporal data in a W4 data model.

An even simpler temporal data modeling issue is to model the various periodic patterns of daily life such as day and night (and subperiods within them such as morning, noon, afternoon, evening, etc.) and the distinction between the workweek and the weekend. In addition, salient periods such as seasons of the year and salient events such as holidays also affect the modeling of temporal data to determine similarity and distance. Furthermore, the modeling of temporal data for IOs that represent RWEs should correlate temporal, spatial, and weather data to account for the physical condition of times at different points on the planet. Different latitudes have different amounts of daylight and even are opposite between the northern and southern hemispheres. Similar contextual and structural data modeling issues arise in modeling data from and about the RWEs for people, groups of people, objects, places, and events.

With appropriate data models for IOs that represent data from or about RWEs, a variety of machine learning techniques can be applied to analyze the W4 data. In an embodiment, W4 data may modeled as a "feature vector" in which the vector includes not only raw sensed data from or about W4 RWEs, but also higher order features that account for the contextual and periodic patterns of the states and action of W4 RWEs. Each of these features in the feature vector may have a numeric or symbolic value that can be compared for similarity to other numeric or symbolic values in a feature space. Each feature may also be modeled with an additional value from 0 to 1 (a certainty value) to represent the probability that the feature is true. By modeling W4 data about RWEs in ways that account for the affordances and constraints of their context and patterns in the physical world in features and higher order features with or without certainty values, this data (whether represented in feature vectors or by other data modeling techniques) can then be processed to determine similarity, difference, clustering, hierarchical and graph relationships, as well as inferential relationships among the features and feature vectors.

A wide variety of statistical and machine learning techniques can be applied to W4 data from simple histograms to Sparse Factor Analysis (SFA), Hidden Markov Models (HMMs), Support Vector Machines (SVMs), Bayesian Methods, etc. Such learning algorithms may be populated with data models that contain features and higher order features represent not just the "content" of the signals stored as IOs, e.g., the raw W4 data, but also model the contexts and patterns of the RWEs that exist, have existed, or will exist in the physical world from which these data have been captured.

As a pre-processor, the correlation engine 506 monitors the information provided by RWEs in order to determine if any conditions are identified that may trigger an action on the part of the W4 engine 502. For example, if a delivery condition has been associated with a message, when the correlation engine 506 determines that the condition is met, it can transmit the appropriate trigger information to the W4 engine 502 that triggers delivery of the message.

The attention engine 508 instruments all appropriate network nodes, clouds, users, applications or any combination thereof and includes close interaction with both the correlation engine 506 and the attribution engine 504.

Figure 6:
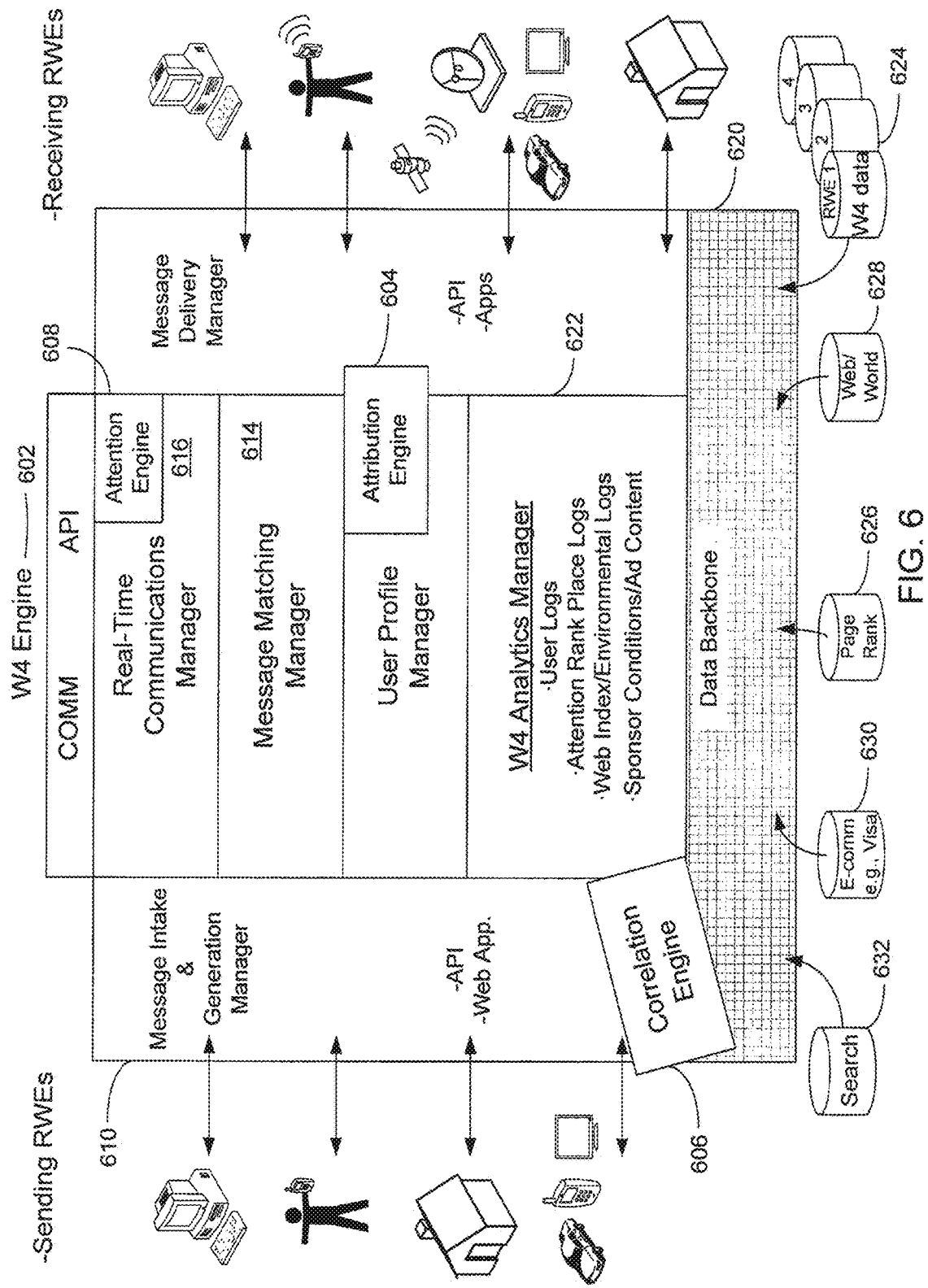
FIG. 6 illustrates an embodiment of a W4 engine showing different components within the sub-engines described generally above with reference to FIG. 5.

FIG. 6 illustrates an embodiment of a W4 engine showing different components within the sub-engines described generally above with reference to FIG. 4. In one embodiment the W4 engine 600 includes an attention engine 608, attribution engine 604 and correlation engine 606 with several sub-managers based upon basic function.

The attention engine 608 includes a message intake and generation manager 610 as well as a message delivery manager 612 that work closely with both a message matching manager 614 and a real-time communications manager 616 to deliver and instrument all communications across the W4 COMN.

The attribution engine 604 works within the user profile manager 618 and in conjunction with all other modules to identify, process/verify and represent ownership and rights information related to RWEs, IOs and combinations thereof.

The correlation engine 606 dumps data from both of its channels (sensors and processes) into the same data backbone 620 which is organized and controlled by the W4 analytics manager 622 and includes both aggregated and individualized archived versions of data from all network operations including user logs 624, attention rank place logs 626, web indices and environmental logs 618, e-commerce and financial transaction information 630, search indexes and logs 632, sponsor content or conditionals, ad copy and any and all other data used in any W4 COMN process, IO or event. Because of the amount of data that the W4 COMN will potentially store, the data backbone 620 includes numerous database servers and datastores in communication with the W4 COMN to provide sufficient storage capacity.

As discussed above, the data collected by the W4 COMN includes spatial data, temporal data, RWE interaction data, IO content data (e.g., media data), and user data including explicitly-provided and deduced social and relationship data Spatial data may be any data identifying a location associated with an RWE. For example, the spatial data may include any passively collected location data, such as cell tower data, global packet radio service (GPRS) data, global positioning service (GPS) data, WI-FI data, personal area network data, IP address data and data from other network access points, or actively collected location data, such as location data entered by the user.

Temporal data is time based data (e.g. time stamps) that relate to specific times and/or events associated with a user and/or the electronic device. For example, the temporal data may be passively collected time data (e.g., time data from a clock resident on the electronic device, or time data from a network clock), or the temporal data may be actively collected time data, such as time data entered by the user of the electronic device (e.g. a user maintained calendar).

The interaction data may be any data associated with user interaction of the electronic device, whether active or passive. Examples of interaction data include interpersonal communication data, media data, relationship data, transactional data and device interaction data, all of which are described in further detail below. Table 1, below, is a non-exhaustive list including examples of electronic data

TABLE 1

Examples of Electronic Data

| Spatial Data | Temporal Data | Interaction Data |
| --- | --- | --- |
| Cell tower data | Time stamps | Interpersonal |
| GPRS data | Local clock | communication data |
| GPS data | Network clock | Media data |
| WiFi data | User input of | Relationship data |
| Personal area network data | time data | Transactional data |
| Network access points data | | Device interaction data |
| User input of location data | | |
| Geo-coordinates data | | |

With respect to the interaction data, communications between any RWEs may generate communication data that is transferred via the W4 COMN. For example, the communication data may be any data associated with an incoming or outgoing short message service (SMS) message, email message, voice call (e.g., a cell phone call, a voice over IP call), or other type of interpersonal communication relative to an RWE, such as information regarding who is sending and receiving the communication(s). As described above, communication data may be correlated with, for example, temporal data to deduce information regarding frequency of communications, including concentrated communication patterns, which may indicate user activity information.

Logical and IO data refers to the data contained by an IO as well as data associated with the IO such as creation time, owner, associated RWEs, when the IO was last accessed, etc. If the IO is a media object, the term media data may be used. Media data may include any data relating to presentable media, such as audio data, visual data, and audiovisual data. For example, the audio data may be data relating to downloaded music, such as genre, artist, album and the like, and includes data regarding ringtones, ringbacks, media purchased, playlists, and media shared, to name a few. The visual data may be data relating to images and/or text received by the electronic device (e.g. via the Internet or other network). The visual data may be data relating to images and/or text sent from and/or captured at the electronic device. The audiovisual data may be data associated with any videos captured at, downloaded to, or otherwise associated with the electronic device. The media data includes media presented to the user via a network, such as use of the Internet, and includes data relating to text entered and/or received by the user using the network (e.g., search terms), and interaction with the network media, such as click data (e.g., advertisement banner clicks, bookmarks, click patterns and the like). Thus, the media data may include data relating to the user's RSS feeds, subscriptions, group memberships, game services, alerts, and the like. The media data also includes non-network activity, such as image capture and/or video capture using an electronic device, such as a mobile phone. The image data may include metadata added by the user, or other data associated with the image, such as, with respect to photos, location when the photos were taken, direction of the shot, content of the shot, and time of day, to name a few. As described in further detail below, media data may be used, for example, to deduce activities information or preferences information, such as cultural and/or buying preferences information.

The relationship data may include data relating to the relationships of an RWE or IO to another RWE or IO. For example, the relationship data may include user identity data, such as gender, age, race, name, social security number, photographs and other information associated with the user's identity. User identity information may also include e-mail addresses, login names and passwords. Relationship data may further include data identifying explicitly associated RWEs. For example, relationship data for a cell phone may indicate the user that owns the cell phone and the company that provides the service to the phone. As another example, relationship data for a smart car may identify the owner, a credit card associated with the owner for payment of electronic tolls, those users permitted to drive the car and the service station for the car.

Relationship data may also include social network data Social network data includes data relating to any relationship that is explicitly defined by a user or other RWE, such as data relating to a user's friends, family, co-workers, business relations, and the like. Social network data may include, for example, data corresponding with a user-maintained electronic address book Relationship data may be correlated with, for example, location data to deduce social network information, such as primary relationships (e.g., user-spouse, user-children and user-parent relationships) or other relationships (e.g. user-friends, user-co-worker, user-business associate relationships) Relationship data also may be utilized to deduce, for example, activities information.

The interaction data may also include transactional data. The transactional data may be any data associated with commercial transactions undertaken by or at the mobile electronic device, such as vendor information, financial institution information (e.g., bank information), financial account information (e.g., credit card information), merchandise information and costs/prices information, and purchase frequency information, to name a few. The transactional data may be utilized, for example, to deduce activities and preferences information. The transactional information may also be used to deduce types of devices and/or services the user owns and/or in which the user may have an interest.

The interaction data may also include device or other RWE interaction data. Such data includes both data generated by interactions between a user and a RWE on the W4 COMN and interactions between the RWE and the W4 COMN. RWE interaction data may be any data relating to an RWE's interaction with the electronic device not included in any of the above categories, such as habitual patterns associated with use of an electronic device data of other modules/applications, such as data regarding which applications are used on an electronic device and how often and when those applications are used. As described in further detail below, device interaction data may be correlated with other data to deduce information regarding user activities and patterns associated therewith. Table 2, below, is a non-exhaustive list including examples of interaction data.

TABLE 2

Examples of Interaction Data

| Type of Data | Example(s) |
| --- | --- |
| Interpersonal communication data | Text-based communications, such as SMS and e-mail<br>Audio-based communications, such as voice calls, voice notes, voice mail<br>Media-based communications, such as multimedia messaging service (MMS) communications<br>Unique identifiers associated with a communication, such as phone numbers, e-mail addresses, and network addresses |

TABLE 2-continued

Examples of Interaction Data

| Type of Data | Example(s) |
| --- | --- |
| Media data | Audio data, such as music data (artist, genre, track, album, etc.) |
| | Visual data, such as any text, images and video data, including Internet data, picture data, podcast data and playlist data |
| | Network interaction data, such as click patterns and channel viewing patterns |
| Relationship data | User identifying information, such as name, age, gender, race, and social security number |
| | Social network data |
| Transactional data | Vendors |
| | Financial accounts, such as credit cards and banks data |
| | Type of merchandise/services purchased |
| | Cost of purchases |
| | Inventory of purchases |
| Device interaction data | Any data not captured above dealing with user interaction of the device, such as patterns of use of the device, applications utilized, and so forth |

Conditional Delivery of Messages on the W4 COMN

One notable aspect of the W4 COMN is the ability to use W4 data to allow users to tailor when and how messages are delivered to other users or their proxies. The information obtained about a W4 entity from any source or communication channel may be used as a basis for delivery conditions for any message delivered via the W4 COMN on any communication channel interoperating with the W4 COMN.

The delivery of messages is a network personal information management (PIM) operation that allows both explicit and implicit automation of W4 COMN circuits, processes and events by logic-based conditions including means for senders, receivers and delivery conditions to be expressed, weighted and prioritized in W4 analytical processes for testing delivery conditions or network environmental conditions. W4 message delivery includes user-, process- or system-generated messages targeted to an intersection of any topical, spatial, temporal, and/or social variables.

To continue the "Who, What, When, Where" conceptualization discussed above, W4 message delivery allows messages to be delivered to any "Who, What, When, Where" from any "Who, What, When, Where" upon the detection of an occurrence of one or more "Who, What, When, Where" delivery conditions. Table 3, below, provides a matrix of some examples of different "Who, What, When, Where" combinations that could be used in W4 message delivery. The listings in Table 3 are not complete nor exhaustive, but are provided to give an idea of the plethora of different message delivery options provided by the W4 COMN.

TABLE 3

Examples of W4 Message Delivery

| From | Delivery Conditions | To | Explanation | Example Message |
| --- | --- | --- | --- | --- |
| Who | When | Who | Person to Person based on time (standard phone or email) or future scheduled (send to daughter on birthday) | Happy Birthday! |
| Who | Who | Who | Person to Person based on Social Conditions (messages between people based on whether other people are present or not or detection of a social relationship) | Stay Away from that Boy.: Don't talk to strangers. |
| Who | Where | Who | Person to Person based on location (send shopping list when roommate enters store) | Don't forget to buy milk. |
| Who | What | Who | Person to Person based on state/topic (raining reminder, content monitor, surf conditions, stock monitor) | This movie is too scary for you.; It will freeze tonight - drain the sprinklers. |
| Where | When | Who | Location to Person based on time (special lunch deals now, birthday alert reminder, costa rica invites you to warmer weather, mardi gras) | Don't forget your wife's birthday at Macy's. |
| Where | Who | Who | Location to Person based on Person (new ad format, lovers enjoy Italian food at Joe's) | Bring your friend back to Jamaica. |
| Where | Where | Who | Location to Person based Location (comparative/poaching advertising, sub-area specialized calls at conference) | Don't buy Starbucks, come to coffee people.; Welcome to Boston eat here. |
| Where | What | Who | Location to Person based on State/Topic (personalized offers from venue based on profile, personalized coupons) | Umbrellas available in the lobby. |
| When | When | Who | Time to Person based on time (calendar updates user, seasonal reminders) | It's summertime don't forget your sunblock.; x shopping days to Christmas |
| When | Who | Who | Time to Person based on Person (holiday messages to spouse when partner is near) | Ask Sally what she wants for your anniversary. |

TABLE 3-continued

Examples of W4 Message Delivery

| From | Delivery Conditions | To | Explanation | Example Message |
|---|---|---|---|---|
| When | Where | Who | Time to Person based on Location (event messages patron; Macy's is closing at 9:00 pm; rush hour re-route) | Don't forget to come to the Pride Parade.; It's Happy Hour at Joe's. |
| When | What | Who | Time to Person based on State/Topic (can be based on a state of a variable such as rain sensor or on the output of a process) | Stop reading email and play with your kids. |
| What | When | Who | State/Topic to Person based on Time (user-defined or process-generated message) | Car says change your oil.; Fridge wants more beer.; Your hair wants to be cut. |
| What | Who | Who | State/Topic to Person based on Person | Diamonds are forever delivered when you meet wife for dinner.; Better safe than sorry, use mouthwash. |
| What | Where | Who | State/Topic to Person based on Location (public service announcement) | Don't' drink and drive.; Don't' forget to buy cheese.; Construction scheduled for next week, use alternate route. |
| What | What | Who | State/Topic to Person based on State/Topic (medical advertising) | Your dreams want you back.; Losing your hair. |
| Who | When | Where | Person to Location based on Time | Happy New Year.; Call a cab as bar closes.; Did Suzie show up for ballet class? |
| Who | Who | Where | Person to Location based on Person (restraining order enforcement, messages to businesses, schools, etc.) | Don't let Sam drink.; Jane is authorized to pick up my child.; This patron is not of legal age. |
| Who | Where | Where | Person to Location based on Location | Make me a reservation at Joe's when I arrive in NYC.; Get my room ready. |
| Who | What | Where | Person to Location based on State/Topic | Diabetic alert to hospital.; Save me the nightly special.; Stop Suzie from using library computer to look at porn. |
| Where | When | Where | Location to Location based on Time | Flight 85 is delayed.; Kids on the way walking home (early dismissal). |
| Where | Who | Where | Location to Location based on Person | Elite customer is being sent over, please treat well.; Suzie has arrived safely at after school. |
| Where | Where | Where | Location to Location based on Location | Conference room contacts lobby because meeting is in new location. |
| Where | What | Where | Location to Location based on State/Topic (automatic inventory restock order) | Airport updates the hotel that I'm stuck in traffic in a cab.; Full hotel looks for rooms at close by. |
| When | When | Where | Time to Location based on Time | Weekly meeting contacts conference room of time change.; Thanksgiving reminds Safeway only two days to holiday. |
| When | Who | Where | Time to Location based on Person | Lent sends message to restaurant to only serve fish.; 4:00 pm contacts school to confirm arrival.; Elvis the left the building. |

TABLE 3-continued

Examples of W4 Message Delivery

| From | Delivery Conditions | To | Explanation | Example Message |
|------|------|------|------|------|
| When | Where | Where | Time to Location based on Location | Weekly meeting contacts conference room because attendees are in Japan |
| When | What | Where | Time to Location based on State/Topic | Wedding to reception hall that its raining/xtra attendees. |
| What | When | Where | State/Topic to Location based on Time | Car to vendor(s) for oil change. |
| What | Who | Where | State/Topic to Location based on Person | Diet to restaurant for special meal requirements. |
| What | Where | Where | State/Topic to Location based on Location | Education plan to bookstore when child enters the mall.; Car to tow truck venue(s) with car location. |
| What | What | Where | State/Topic to Location based on State/Topic | Refrigerator to Safeway for more eggs. |
| Who | When | When | Person to Time based on Time | One week before my birthday, broadcast.; schedule reminder for annual physical. |
| Who | Who | When | Person to Time based on Person | Get STD test next week after dating that person. |
| Who | Where | When | Person to Time based on Location | Schedule dinner with Marc when he is in town. |
| Who | What | When | Person to Time based on State/Topic | Send a message to the future to renew warranty. |
| Where | When | When | Place to Time based on Time | Gallery sends reminders based upon a opening night, Macy's sends out "One week to the Men's sale." |
| Where | Who | When | Place to Time based on Person | Cody's books sends to calendar that Al Gore is speaking. |
| Where | Where | When | Place to Time based on Location | Restaurant sends out a message in a given radius "we are closing in an hour and still have tables." |
| Where | What | When | Place to Time based on State/Topic | Vendor contacts loyal customer after six weeks of no show. |
| When | When | When | Time to Time based on Time | Calendar to calendar based on missed meeting. |
| When | Who | When | Time to Time based on Person | Calendar to calendar based on required attendee's absence. |
| When | Where | When | Time to Time based on Location | Calendar to Calendar based on room availability. |
| When | What | When | Time to Time based on State/Topic | Calendar to Calendar based on subject matter of meeting.; AC filter replacement. |
| What | When | When | State/Topic to Time based on Time | AC to calendar based on service cycle.; Diet plan to calendar to schedule exercise due to lack thereof. |
| What | Who | When | State/Topic to Time based on Person | Event Plan to lunchtime for vegetarian based on Marc joining.; collaborative restaurant recommendation. |
| What | Where | When | State/Topic to Time based on Location (reminders to buy things based on when/where you are; product to calendar with availability for locations) | Put your chains on before going over Grant's pass; Strawberries should be ripe next week. |

TABLE 3-continued

Examples of W4 Message Delivery

| From | Delivery Conditions | To | Explanation | Example Message |
|---|---|---|---|---|
| What | What | When | State/Topic to Time based on State/Topic | Refrigerator to Sunday that milk is expired.; Car to weekend-wash. |
| Who | When | When | Person to Time based on Time | Schedule annual/recurring maintenance.; |
| Who | Who | When | Person to Time based on Person | Auto birthday reminder based on social interaction.; Parent schedules discussion with kid based on associations. |
| Who | Where | When | Person to Time based on Location (travel reminder to leave in time to reach destination on time; auto refresh on calendar to push out rest of day by x time) | Make follow up appointments.; Wake up message to spouse when traveling.; Closing notice triggered by proximity. |
| Who | What | When | Person to Time based on State/Topic (schedule future event based on past due now; schedule discussion on online browsing with child based on surf history) | Santa to Christmas that Johnny is Bad.; cancel dinner because I'm sick.; schedule gym time because I ate too much.; |
| Where | When | When | Place to Time based on Time | Meeting room to calendar that current meeting is going long.; School to calendar that students are getting out early. |
| Where | Who | When | Place to Time based on Person (Tuesday kids eat free; Wed is ladies night) | Venue to calendars that celebrity ate here; theme park to calendar for summer camp based on visit with child |
| Where | Where | When | Place to Time based on Location | SFO to calendar that plane is still in Denver; School to calendar based on museum visit. |
| Where | What | When | Place to Time based on State/Topic | Venue to calendar to leave early due to traffic/terrorist threat.; farm to market calendar of expected harvest |
| When | When | What | Time to State/Topic based on Time | Calendar to Car based on 3 months since last oil change.; calendar to alarm clock/coffee maker. |
| When | Who | What | Time to State/Topic based on Person | Calendar to Refrigerator based on Uncle Joe staying with us. |
| When | Where | What | Time to State/Topic based on Location | Calendar to bathtub based on being at gym. |
| When | What | What | Time to State/Topic based on State/Topic | Birthday to car based on web browsing.; sunset to car to make sure the door's are locked. |
| What | When | What | State/Topic to State/Topic based on Time | Alarm clock to washing machine/coffee machine with start time. |
| What | Who | What | State/Topic to State/Topic based on Person | Car to clothes because of association.; Dating plan to clothes not to be worn around sally.; Dating plan to toothbrush to be used and brought. |
| What | Where | What | State/Topic to State/Topic based on Location | 12 steps to car based on entering bar.; Weight to belt based on restaurant.; Badge beeps car that it has been forgotten. |

TABLE 3-continued

Examples of W4 Message Delivery

| From | Delivery Conditions | To | Explanation | Example Message |
|---|---|---|---|---|
| What | What | What | State/Topic to State/Topic based on State/Topic | Shirt to washing machine to remove black sock from whites.; Forgot item to backpack. |
| Who | When | What | Person to State/Topic based on Time | Programming alarm clock.; Attorney registering with bar association.; Tell the bath to start at 6:00 pm |
| Who | Who | What | Person to State/Topic based on Person | Parent to child's clothes.; Adaptive fashion based on association.; Bumper stickers on car change based on who is watching. |
| Who | Where | What | Person to State/Topic based on Location (user to user-defined plan based on attention) | Customized content instructions depending on locale.; Auto-changing location sensitive ringtones. |
| Who | What | What | Person to State/Topic based on State/Topic (user to user-defined plan based on feedback; parent to phone if drugs are present - behavior modification space) | Wife to marriage plan based on husband's surfing.; Message to car to beep when less than half gas.; |
| Where | When | What | Place to State/Topic based on Time | Dealership to car to come in for tune up. |
| Where | Who | What | Place to State/Topic based on Person | Restaurant to car based on occupants.; Playground to parenting plan based on play. |
| Where | Where | What | Place to State/Topic based on Location | Parking lot to car with closest vacancies/best prices. |
| Where | What | What | Place to State/Topic based on State/Topic | Repair vendor to car after accident. |

The list provided in Table 3 is a very limited list of the possibilities for message delivery via the W4 COMN. It should be noted that the delivery conditions could be a simple condition, such as a time or detection that a designated RWE is at a location, or a more complex condition based on the occurrence of multiple conditions, either at the same time or in a specific order, such as deliver only on the day of a baseball game to a RWE near a specified location. In the baseball game example, the baseball game may be considered to be an event, with its own unique W4 identifier, that is associated with a location and a time period. For events such as sporting events, meetings, holidays, etc., one or more IOs may exist on the W4 COMN or an electronic calendar that are a proxy for the event from which the time, location, and other relevant data of the event may be obtained.

In a broad sense, W4 message delivery allows a message (which may be any IO including text-based messages, audio-based message such as voicemail or other audio such as music or video-based prerecorded messages) to be delivered in accordance with delivery conditions based on any combination of the available W4 data types, including topical, spatial, temporal, and/or social data. Furthermore, because the W4 COMN coordinates delivery of messages via multiple communication channels and through multiple devices and other RWEs, it allows the communication channel for delivery of a message to be dynamically determined upon detection that the delivery conditions are met. Examples include a social alarm clock, place-based messages, social proximity-based messages, and time-shifted message delivery, to name but a few applications of the W4 message delivery functionality.

Predetermined sets of W4 delivery conditions can be packaged and provided to users in common bundles, e.g., a Parent's Package, a Boss' Package, a Vehicle Maintenance Package, etc. These bundles may include predetermined message content, delivery conditions and delivery condition templates that allow the users to quickly construct delivery conditions for messages that will be easily and clearly interpreted by the W4 COMN's message delivery subsystems.

Figure 7:
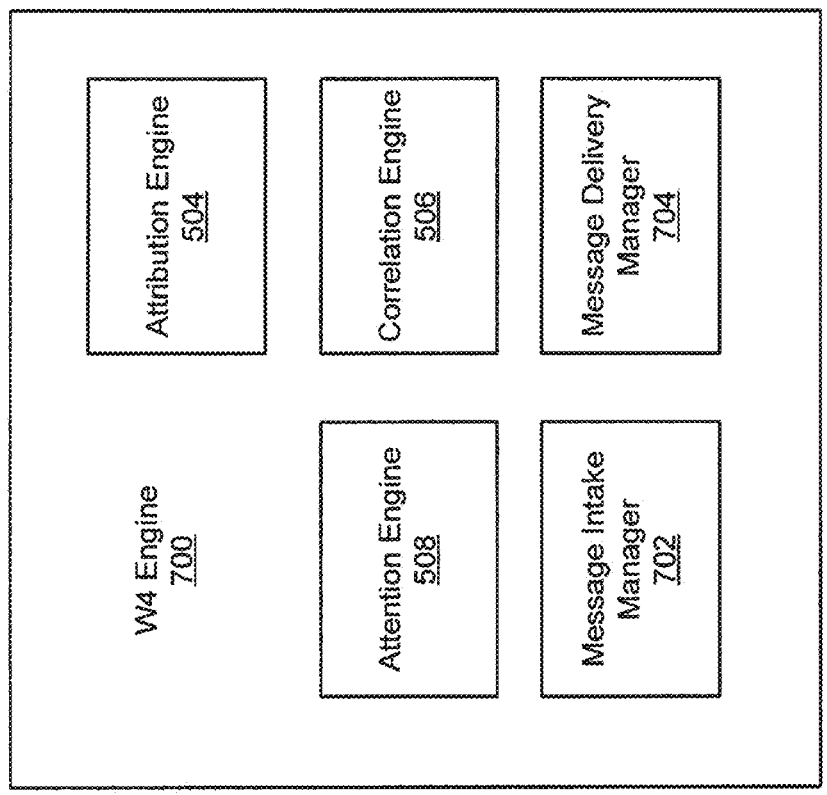
FIG. 7 illustrates elements of an embodiment of a W4 engine adapted to perform W4 message delivery as described herein.

FIG. 7 illustrates elements of an embodiment of a W4 engine adapted to perform W4 message delivery as described herein. The W4 engine 700 includes a correlation engine 506, an attribution engine 504 and an attention engine 508 as described above. The W4 engine 700 is provided with a message intake manager 702 that is adapted to receive messages and their associated delivery conditions from senders via the various communication channels interoperating with the W4 COMN.

As discussed above, it should be understood that multiple RWEs and IOs may be associated with a single message as a sender. For example, a user may create and send an email message with delivery conditions using a laptop computer. The user is an RWE having a unique W4 identifier. In addition, the laptop is an RWE with its own unique W4 identifier. The email application on the laptop may be tracked as an IO with its own W4 identifier. In an embodiment, some or all of the user, laptop computer and email application may be considered a sender of the that is the email message. In this case, the user may be considered the originating sender and the laptop and email application proxies for the originating sender. The concept of proxies was discussed above and is particularly important here where it is anticipated that human actors, either as senders, recipients or entities tied to a delivery condition, will be known to the W4 COMN primarily through information obtained from their proxies (e.g., proxy RWEs, such as their smart phones, computing devices, sensors, smart vehicles, home phones, etc., and proxy IOs such as email accounts, communication software, credit card accounts, data objects containing data generated by a RWE, data objects containing data about an RWE or event, etc.).

In an embodiment, this determination of the senders of a message, including determining who the user, if any, is that should be considered the original sender may be performed by the attribution engine 504 as described above. It should also be noted that some messages may be sent by a process programmatically, e.g., automatically during the course of the execution of a program, so that there is not a human sender to be identified but rather only a sender IO. Alternatively, the attribution engine 504 may only identify the sending RWE that actually places the message into the W4 COMN and any other associated RWEs (e.g., proxies and/or originating sender) may be identified by the message intake manager 702 in conjunction with the correlation engine 506.

The message intake manager 702, upon receipt of a message with delivery conditions, identifies the recipients and the delivery conditions of the message as described below. This may include requesting that the correlation engine 506 correlate the channel-specific identifiers of the recipients with other W4 data in order to identify a target human recipient, if any, and any proxies for that recipient. In addition, the same information may need to be determined for RWEs identified in the delivery conditions.

It should be understood that any human or non-networked entity that is a sender, recipient or subject of a delivery condition of a message may be identified only by proxy RWEs or IOs. For example, an email may be sent by or directed to "john.smith@yahoo.com" or a telephone call may be directed to "(720)555-0505." In both cases, the identifiers used to identify the human (i.e., "john.smith@yahoo.com" and "(720)555-0505") are identifiers of proxies of the actual intended human recipient. Based on the W4 data known to the W4 COMN, these identifiers of proxies may be analyzed. e.g., by the correlation engine 506, in order to determine the unique W4 identifier of the RWE that is accessed by, represented by or working through the proxy RWE or proxy IO. For example, "john.smith@yahoo.com" and "(720)555-0505" may be communication channel-specific identifiers of RWEs or IOs that the W4 COMN is aware are proxies for a known human RWE (e.g, a user with the name John Smith) with a distinct unique W4 identifier.

The W4 engine 700 further includes the message delivery manager 704 that controls the delivery of messages. In an embodiment, the message delivery manager 704 logs the delivery conditions for a message and monitors the W4 data for occurrence of the delivery conditions. When/if the delivery conditions are met, the message delivery manager 704 then delivers the message to the recipient. This may include selecting a delivery route or communication channel and selecting the appropriate proxy RWE (if applicable) for delivery of the message, possibly including reformatting the message for the selected RWE. For example, for an email message that is to be delivered to a recipient when that recipient is at a specified location, the email message may be reformatted as a text for display via a cellular phone or vehicle-mounted display device that is one of the recipient's proxy devices and delivered to that device when it is determined that the device is at the specified location. Similarly, voicemails that are to be delivered to a recipient when a certain team wins a game may be reformatted and transmitted to whatever proxy device the recipient may be using at the time that the team wins the game. Thus, the voicemail may be delivered to a cell phone number, a voicemail inbox, an email inbox as an attachment to an email, or at a work telephone number depending on what the recipient is doing at the time the team wins the game.

In order to determine when delivery conditions are met, the message delivery manager 704 may utilize the correlation engine 506 to monitor the W4 data. Furthermore, a determination that a delivery condition has been met may be possible only through the graphing and identification of relationships based on the correlations between IOs and RWEs known to the W4 COMN. The relationships may be determined in response to a request to deliver a message, triggered by some other input, or may be automatically determined by the correlation engine on a periodic basis and stored for later use.

Figure 8:
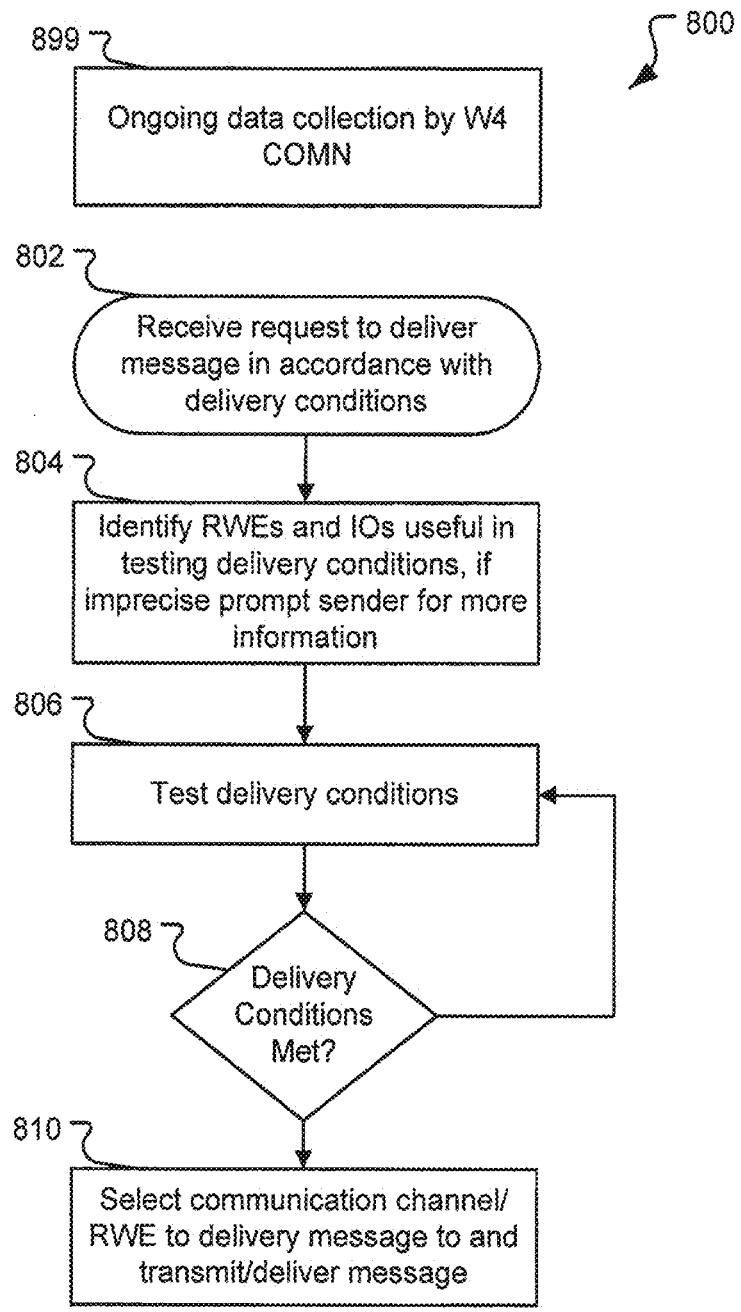
FIG. 8 illustrates an embodiment of a method for delivering messages over a network based on social, temporal, spatial and topical data for entities on the network.

FIG. 8 illustrates an embodiment of a method for delivering messages over a network based on social, temporal, spatial and topical data for entities on the network. In the embodiment described below, depending on how the architecture is implemented, the operations described may be performed by one or more of the various components, engines and managers described above. In addition, sub-engines may be created and used to perform specific operations in order to improve the network's performance as necessary.

As described above, a foundational aspect of the W4 COMN that allows for conditional message delivery is the ongoing collection and maintenance of W4 data from the RWEs interacting with the network. In an embodiment, this collection and maintenance is an independent operation 899 of the W4 COMN and thus current W4 social, temporal, spatial and topical data are always available for use in testing of delivery conditions. In addition, part of this data collection operation 899 includes the determination of ownership and the association of different RWEs with different IOs as described above including prioritization among specific groups or sub-groups of RWEs and IOs. Therefore, each IO is owned/controlled by at least one RWE with a known, unique identifier on the W4 COMN and each IO may have many associations with other RWEs that are known to the W4 COMN In the embodiment shown, the method 800 is initiated when a message with a delivery condition is detected by the W4 COMN in a receive delivery request operation 802. Such a request may be generated by software on a computing device operated by a user, by an automated process or by a "dumb" device such as a cellular phone or a sensor. As discussed above, one or more RWEs may be identified as a sender of the message. Such identifications may be made from the data of the message, the source of the request or a combination of both. In addition, deductions may be made concerning a user that is the sender of the message based on W4 data for the known device or software senders of the message, as previously described.

The delivery request will further identify one or more recipients of the message. As discussed above, each recipient may be identified by a channel-specific identifier of a proxy RWE of the recipient. Thus, similar to the situation with senders, there may be multiple recipients associated with a message. For example, a recipient of an email may be identified as "bill.smith@yahoo.com", which is an email address for a electronic mail account. Using the W4 data, it may be determined that the user associated that email address has multiple proxies on the W4 COMN including for example the email account identified by "bill.smith@yahoo.com", a mobile telephone identified with a telephone number, a home telephone identified by a different telephone number, a toll payment transponder identified by a transponder identification number, a car identified by a license plate, an internet protocol (IP) address, a business telephone identified by a third telephone number, and a home address identified by one or more physical location coordinates or addresses. In an embodiment, requests to deliver a message to a recipient that is determined to be a proxy for a user (or other RWE such as a business or location) may be interpreted as requests to deliver the message to the user (or other RWE) that is accessible via the proxy as discussed below.

In an embodiment, the delivery condition may be part of the delivery request or may be included in an IO (e.g., as data or metadata) that constitutes the message. In such a situation, the address string or information is associated with the IO that is to be delivered. Such address string or address information may also be a part of the IO to be delivered. A request may also occur upon detection of an address string, such as for example, a user entering an address string into a field in an email composition screen or speaking an address string into a microphone on a device.

In an embodiment, the delivery conditions may be designated by the sender of the message, which may be an RWE, typically a user, or an IO, such as a process executing on a computing device. Any suitable way of selecting and associating the delivery conditions with the message may be used as long as the W4 COMN can identify the resulting data that embodies the delivery conditions. For example, for an email message the delivery conditions may be entered by the user into a delivery options interface provided by the email application, such delivery conditions then being stored as metadata of the message: this metadata then is decoded by the W4 COMN to identify the delivery conditions. For a telephone call, a message delivery system could use a voice or keypad data entry system to allow the caller to assign or select delivery conditions to the voice message from a audible menu. Delivery conditions may also be automatically generated and added to messages, for example by an application such as a parental control application that sends messages upon the detection certain activities or content Other methods of associating delivery conditions with a message are possible and any suitable method may be used with the embodiments of the systems and methods described herein.

In the method 800, the RWEs and IOs may be identified in the delivery conditions by any identifier, unique or non-unique, communication channel-specific or global, as long as the identifier can be resolved by the W4 COMN to its intended target RWE or IO. Resolving channel-specific identifiers can be done by correlating the channel-specific identifier with other W4 data. Non-unique identifiers (e.g., identifiers such as "Mom", "father", "Debby", "Bob", "Starbucks") may have to be disambiguated based on the W4 data known about the sender and the message to be delivered and any suitable disambiguation method may be utilized for this purpose.

In the embodiment, the message with delivery conditions may be considered to be detected when it is received from the sender(s), although the reader will understand that the message may not have actually been sent at the time of receipt of the delivery conditions. It is anticipated that under most circumstances that any attributable sender will already be known to the W4 COMN and provided with a unique W4 identifier as well as at least one communication channel-specific address (which is another form of unique identifier).

As mentioned above, the receive delivery request operation 802 may include receiving an actual IO (e.g. message file or snippet of text) from an RWE or an IO such as a email software being executed by an RWE, the IO to be transmitted as directed by the address string or pointer to an IO at another address or location. The IO may contain data such as the text or contents of the communication as well as additional information in the form of metadata. The data contained may be evaluated in order to identify the delivery conditions, additional RWEs associated with the message (e.g., people listed in text of a message but that are neither the sender nor a recipient), other IOs (e.g., hyperlinks to IOs, attachments, etc) contained in the message, and any topics discussed in the message.

The receive delivery request operation 802 may be considered to occur at any point in the delivery chain within the W4 COMN, e.g., by any one of the engines used to conduct IO intake, routing or delivery. For example, depending on how the implementers of the W4 COMN choose to implement the network functions, a message may be received and initially analyzed and information routed to the correlation engine and addressing engine by any one of the message intake and generation manager, user profile manager, message delivery manager or any other engine or manager in the W4 COMN's communication delivery chain.

After detection of delivery conditions associated with a message, the delivery conditions are analyzed in a delivery condition identification operation 804. The delivery condition identification operation 804 includes identifying each RWE in the delivery condition and what the actual delivery conditions are with respect to the RWEs. This may require parsing a string containing the delivery conditions or some other analysis of the data or metadata for the message. For example, an IO may be emailed by a sender addressed to a recipient (identified by an email address) with the delivery condition that the message should only be delivered when the recipient is at/with a specified RWE (e.g., another person, a location such as a park, or a business such as a grocery store. Laundromat, a coffee shop, etc.). In this example, the delivery condition identification operation 804 will identify the recipient, the specified RWE and a maximum distance or range of distances between the two that indicates the delivery condition is met (which may or may not be explicitly provided in the delivery condition).

As discussed above, the recipients and any RWEs in the delivery conditions may be proxies for users or other RWEs. The identification operation 804 includes determining whether the recipient and delivery condition RWEs are proxies or the actual target of the message. In addition if a specified RWE is a proxy, the identification operation 804 further includes identifying any RWEs that may be used as proxies for the specified RWE and for any RWEs for which the specified RWE is, itself, a proxy.

For example, given the relationships described in FIG. 1, a sender of an IO may specify an email address for the user 102 as a recipient and a delivery condition that the recipient (again identified by the email address) and user 144 (which may also be identified by some proxy identifier such as telephone number or email address) must be together (i.e., co-located). By retrieving the W4 data for the email address, it can be determined that it is a proxy for the user 102 and that the user 102 has many other proxies that could be used to identify the location of the user 102 including the car 106 and cell phone 104. The identification operation 804 would further identify the IOs (e.g., IOs 122, 124, 126) from which the current location information may be obtained for each of the identified proxies for the current location of the user 102. The process is repeated for the user 144, thus identifying the user 144 from the RWE identifier provided in the delivery conditions, if user 144 has any proxies, and where to obtain current location information for each of the proxies.

The identification operation 804 may distinguish between proxies based on the data available for the proxy and the delivery condition when identifying the proxies to be used to determine if a delivery condition is met. For example, a work email account for a user may be a proxy for the user, but if no current location data may be derived from user's use of the email account (e.g., the email account may be accessed from multiple devices and/or from multiple or any location), the work email account may not be identified as a proxy for the location of the user. If however, the device the user uses to access the work email account at any given time can be identified and its location can be determined (e.g., a public computer on a network that the user uses to access his email account), then the device could be used as a proxy of the location of the user by virtue of its current relationship with the user's email account, even though the device may never have been used by the user before.

In an embodiment, the W4 engine may assume that for any identified RWE that is explicitly designated as a proxy for another RWE, that the other RWE is the intended entity and substitute it for identified RWE. For example, if an IO is emailed by a sender addressed to a recipient (identified by an email address) with the delivery condition that the message should only be delivered when the recipient is at/with a specified RWE, the IO may be delivered when it is determined that the recipient's cell phone (e.g., a proxy for the recipient, but not necessarily a proxy for the recipient's email account) is close enough to the specified RWE's cell phone (e.g., a proxy for the recipient) and the IO may also be delivered when it is determined that both the specified RWE and the recipient RWE are attending the same meeting/event based on message traffic, financial data (e.g., confirmation of event ticket purchase or detection of concurrent sales made at same location) or smart calendar entries.

The identification of proxies, as discussed above, may be explicit (e.g., designated as proxies by their associated user or RWE) or implicitly determined based on an analysis of W4 data. As discussed above, such W4 data may have been collected from messages, communications and IOs previously obtained or handled by the W4 COMN via many different communication channels and systems, including email and text-based communication channels as well as any communication channels that include audio data including channels that support telephone, voice over internet protocol (VOIP), and video communications such as video chat.

To determine implicit proxies, the W4 data may be graphed in order to determine what RWEs are related and how and from this information make probabilistic assumptions about the nature of the relationships between RWEs. In an embodiment, correlations are made for and between each of the RWEs known to the W4 COMN based on the social data, spatial data, temporal data and logical data associated with each RWE. In one sense, the graphing operation may be considered a form of comparing the retrieved social data, spatial data, temporal data and logical data for all RWEs to identify relationships between RWEs and other contextual similarities.

It should be noted that the determination of implicit proxies may be performed each time a delivery condition is tested. This allows for the dynamic determination of the appropriate proxy for any RWE at any time. For example, during the week a corporate car or corporate cell phone may be considered a good proxy for the location of a recipient, but during the weekend a personal cell phone or personal car may be considered a better proxy for the recipient than the work cell phone.

After the RWEs, including any proxy RWEs, that may be used to confirm the occurrence of the delivery conditions are identified, the delivery condition identification operation 804 then identifies one or more data sources for the data necessary to test the delivery conditions. For example, if the delivery condition has a location requirement, data sources for the current location of the recipient and the specified RWEs will be identified. If the delivery condition has a temporal requirement, a system clock or the local time for the recipient and the specified RWEs may be identified. If the delivery condition has a status or state-related condition (e.g., a condition based on some identified current sensor readings or other condition such as current traffic conditions, current weather conditions, current speed, what an RWE is currently doing, current weather forecast, occurrence of a defined event, etc.), the appropriate data source or sources are identified that contain the current information necessary to test these conditions so that the message can be delivered upon determination that the current state of the RWE matches the specified state identified by the delivery condition.

For example, if the recipient is a user with a cell phone, the cell phone may be identified as the proxy for the current location of the recipient. The identification operation 804 will then identify the location of the data source from which the current location of the cell phone may be obtained. Such a data source, for example, may be maintained by the cellular service provider and accessible through their network. Alternatively, the cell phone may be provided with a GPS locator and the current location may be accessible from the cell phone itself. If the specified RWE is a business, a proxy RWE may not be needed but a proxy IO that contains information about the business including its current location(s) may be identified.

The delivery condition identification operation 804, as mentioned above, further includes identifying what constitutes the delivery condition(s) being met. For example, if the delivery condition requires an RWE be at a location, a range of distances between the RWE and identified location that, as far as the W4 COMN is concerned, will be treated as being "at" the location. Such a range may be predetermined by the operators of the W4 COMN (e.g., "at" is defined as within 10 meters), provided or otherwise selected by the sender as part of the delivery conditions or dynamically determined based on the data available and the precision of the location data or the application package or requirements.

If the delivery condition has a temporal requirement, a location may need to be identified if the sender designated only a relative time (e.g., Thursday at 6:00 am or Christmas) as opposed to an absolute time (Thursday, Nov. 8, 2007, 6:00 am Mountain Standard Time). The W4 COMN may, unless otherwise specified, assume all times are local to the sender or the recipient and, when future times are designated imprecisely, the sender may be prompted for more information or the next possible match may be used.

If the delivery condition has a status or state-related condition, the appropriate condition is quantified so that it can be tested using the data from identified data source or sources. Again, the exact condition may have been specified by the sender (e.g., "deliver if winds greater than 40 mph detected at home") or the condition may need to be determined from a less specific designations (e.g., "deliver if high winds detected at home"). For example, a delivery condition based on "heavy traffic" at a location will identify what constitutes heavy traffic in terms of the metrics monitored by and accessible from the identified traffic sensor. Thus, a threshold or range of values that will be considered to be "heavy traffic" when detected may be identified or a definition retrieved. As another example, the delivery condition "when the recipient is playing computer games" may be determined by identifying what software constitutes computer games and determining if the software is active at any particular moment. Furthermore, a delivery condition's quantification may not be the same for every instance of the delivery condition, but rather may be independently determined based on the current context and W4 data.

If the identification operation 804 can not adequately identify any of the parameters, RWEs and IOs described above or identify the delivery conditions to the extent sufficient to determine when a delivery condition has been met, the sender may be notified and asked for additional clarifying information. For example, in such a situation the W4 COMN may respond by prompting the sender of the message with a question such as, "By 'deliver to debby at the grocery store', do you mean your wife Deborah or your sister Deborah?" The prompt may include information derived from previous communications or other W4 data to assist the sender in confirming the proper identification of the recipient and delivery condition.

In addition, in an embodiment the delivery conditions may be very specifically designated by the sender when the message was created. For example, a sender may direct the W4 COMN to deliver a message only to the recipient via the recipient's cell phone, when the recipient's car and cell phone both are detected near a specified location at the same time so that when the sender can be certain that the message will not be delivered when, for instance, the recipient cycles by the gas station with the recipient's cell phone or when the sender drives by the location in the recipient's vehicle. This allows the sender to be very specific in defining delivery conditions, if that is what is desired or necessary for proper delivery of the message the way the sender intended.

After the delivery condition(s) and recipient(s) have been identified as described above, the delivery conditions are tested in a testing operation 806. This will include inspecting the necessary data sources and comparison of the various data elements (e.g., current location, temperature, state, etc.) as needed to determine if the delivery condition is met. In an embodiment, testing may include retrieving or requesting data from the identified data sources. The testing operation 806 may require only simple comparisons, e.g., comparing two values, such as current locations, to determine if the values are within a specified range. The testing operation 806 may be more complicated such as requiring complex calculations or simultaneous testing of multiple conditions related to a plethora of different RWEs and may include gathering and analyzing data from external sources.

Based on the results of the testing operation 806, a determination operation 808 determines if the delivery condition(s) are met or not. If the conditions are not met, then the delivery conditions are retested by repeating the testing operation 806. By such repeated testing the W4 data is monitored for occurrence of the delivery conditions. The retesting may be done periodically on a fixed schedule or dynamically in response to external conditions such as the receipt of new data on the W4 backbone related to RWEs implicated by the delivery conditions. The retesting may be done in perpetuity until the conditions are met or for a predetermined maximum time period specified by the sender or the W4 COMN. If a message cannot be delivered before the maximum time period is reached, the sender may be notified that the message was not delivered due to the delivery conditions not being met, e.g., "Message not delivered because Debby did not visit the grocery store within the specified period."

If the determination operation 808 determines that the delivery conditions are met, the message is then transmitted to the recipient(s) in a delivery operation 810. In an embodiment, if the identified recipient is a proxy RWE, the message may be delivered to the proxy RWE regardless of the conditions identified that met the delivery condition. For example, an email may be sent to an identified email address when the cell phone of the user associated with that email address is detected at the delivery condition location. However, in this situation it is possible that the user may not receive the email until later if the cell phone is not email-enabled.

Alternatively, the method may select a communication channel and RWE to deliver the message to based on the conditions that triggered the delivery. For example, if a message is an email and the delivery condition is the recipient being at a location, upon detection that the recipient's cell phone is at the location the message may be reformatted for the recipient's cell phone, such as into an IM or SMS message, and transmitted to the cell phone via the cellular communication network servicing the cell phone. In such an embodiment, not only the identified proxy RWE of a recipient but all other proxies for the recipient (or other RWE) are considered possible delivery routes to the recipient. This allows the W4 message delivery system to select the most appropriate delivery route/communication channel/proxy combination when finally delivering the message, regardless of what delivery route/communication channel/proxy was initially identified as the recipient or used by the sender to create and send the message to the W4 COMN.

Such a dynamic message delivery system allows the delivery of message by alternative but effective means. For example, based on W4 data the cell phone of a user's best friend may be selected as a proxy for the user (as well as for the best friend) and a message to the user may be automatically delivered to the best friend's cell phone when delivery conditions are met and it is determined that the user and the best friend's cell phone are co-located. Under these circumstances the message delivery method can quickly and effectively deliver messages by communication channels and to devices that are completely unknown to the sender. As another example, when traveling, email messages for a user may be automatically delivered to coworkers with the user if the user does not have email access.

In addition, in an embodiment the delivery channel and RWE may be specifically designated by the sender when the message was created. For example, a sender may direct the W4 COMN to deliver a message only to the recipient via the car, when the car is detected near a gas station so that when the recipient cycles by the gas station with the recipient's cell phone delivery of the message is not triggered. Alternatively, the sender may identify that the W4 COMN dynamically select the communication route and recipient proxy device so that the message is delivered to the recipient in the manner that is most likely to get the message to the intended recipient user (as opposed to proxy for the user) upon occurrence of the delivery conditions.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure. For example, in an embodiment the methods and systems could be used to initiate two-way communications via audio or video connections between RWEs upon the occurrence of a delivery condition, e.g., a call between two cell phones could be made automatically upon the detection of a delivery condition. As another example, the delivery method could be used to create a virtual soundtracks for workouts based on delivering and playing different songs based on the current location, current speed, etc. of the exercising user. As another example, the delivery method could be used to create immersive reality games that provide feedback to players based on detection of different conditions caused by the players actions. In such an embodiment, devices may be created specifically to act as sensors and data inputs for use in game play, allowing for delivery conditions to be tailored to any action, e.g. striking a target with an infrared gun within a certain period of time. Numerous other changes may be made that will readily suggest themselves to those skilled in the art and which are encompassed in the spirit of the invention disclosed and as defined in the appended claims.

What is claimed is:

1. A method comprising:
   receiving from a sender, at a computing device, a request to communicate a message from a real-world entity (RWE) to another RWE;
   receiving, at the computing device, one or more delivery conditions associated with the request, wherein one delivery condition sets a predefined distance from a reference RWE;
   identifying, via the computing device, the reference RWE based in part upon the one or more delivery conditions being associated with social data, spatial data, temporal data and logical data for the reference RWE;
   retrieving, via the computing device, data associated with a plurality of RWEs within the predefined distance of the reference RWE, the data comprising social data, spatial data, temporal data and logical data for each of the plural RWEs; and
   delivering, over a network, the message when a predefined number of the plural RWEs are within the predefined distance of the reference RWE.

2. The method of claim 1, wherein the predefined number of the plural RWEs is determined based on relationships between the plural RWEs that are within the predefined distance of the reference RWE.

3. The method of claim 2 wherein relationships are determined based on any one or more or the following data types: social, RWE interaction, temporal, TO content, and user.

4. The method of claim 1 wherein the predefined number of the plural RWEs is determined based on similarity of states between the plural RWEs.

5. The method of claim 1, wherein each RWE is one of a person, device, or location.

6. The method of claim 5, wherein the delivery condition identifies two RWEs and a range of distances between the two RWEs and the method further comprises:
   periodically determining, from the data, a current location of each of the two RWEs;
   calculating at least one actual distance between the two RWEs based on their current locations; and
   delivering the first message when the actual distance is within the range of distances.

7. The method of claim 5, wherein the delivery condition identifies two RWEs, a range of distances between the two RWEs and a temporal condition and the method further comprises:
   periodically determining, from the data, a current location of each of the two RWEs and current time;
   calculating at least one actual distance between the two RWEs based on their current locations; and
   delivering the first message upon determination that the actual distance is within the range of distances and the temporal condition is met based on the current time.

8. The method of claim 5, wherein the delivery condition identifies a specified state of an RWE and the method further comprises:
   periodically determining, from the data, a current state of the RWE; and
   delivering the first message upon determination that the current state of the RWE matches the specified state identified by the delivery condition.

9. The method of claim 5, wherein the delivery condition is a temporal condition identifying a specified time relative to an event time and the method further comprises:
- retrieving an information object (TO) identifying the event time;
- monitoring a current time; and
- delivering the first message upon determination that the current time is the specified time relative to the event time.

10. The method of claim 5, wherein the delivery condition identifies two first RWEs, a range of distances between the two first RWEs and a specified state of a second RWE and the method further comprises:
- periodically determining, from the data, a current location of each of the two first RWEs;
- calculating at least one actual distance between the two RWEs based on their current locations;
- periodically determining, from the data, a current state of the second RWE; and
- delivering the first message upon determination that the actual distance is within the range of distances and the current state matches the specified state.

11. The method of claim 5, wherein the delivery condition identifies a specified state of an RWE and a temporal condition and the method further comprises:
- periodically determining, from the data, a current state for each of the RWEs and a current time; and
- delivering the first message upon determination that the current state of the RWE matches the specified state identified by the delivery condition and the temporal condition is met.

12. A non-transitory computer-readable storage medium tangibly encoded with computer-executable instructions, that when executed by a processor associated with a computing device, perform a method comprising:
- receiving from a sender a request to communicate a message from a real-world entity (RWE) to another RWE;
- receiving one or more delivery conditions associated with the request, wherein one delivery condition sets a predefined distance from a reference RWE;
- identifying the reference RWE based in part upon the one or more delivery conditions being associated with social data, spatial data, temporal data and logical data for the reference RWE;
- retrieving data associated with a plurality of RWEs within the predefined distance of the reference RWE, the data comprising social data, spatial data, temporal data and logical data for each of the plural RWEs; and
- delivering the message when a predefined number of the plural RWEs are within the predefined distance of the reference RWE.

13. The non-transitory computer-readable storage medium of claim 12, wherein the predefined number of the plural RWEs is determined based on relationships between the plural RWEs that are within the predefined distance of the reference RWE.

14. The non-transitory computer-readable storage medium of claim 13 wherein relationships are determined based on any one or more or the following data types: social, RWE interaction, temporal, TO content, and user.

15. The non-transitory computer-readable storage medium of claim 12 wherein the predefined number of the plural RWEs is determined based on similarity of states between the plural RWEs.

16. The non-transitory computer-readable storage medium of claim 12, wherein each RWE is one of a person, device, or location.

17. A system comprising:
- at least one computing device comprising:
- one or more processors for executing computer-executable instructions;
- memory for storing computer-executable instructions, the instructions comprising code for causing:
  - receiving from a sender a request to communicate a message from a real-world entity (RWE) to another RWE;
  - receiving one or more delivery conditions associated with the request, wherein one delivery condition sets a predefined distance from a reference RWE;
  - identifying the reference RWE based in part upon the one or more delivery conditions being associated with social data, spatial data, temporal data and logical data for the reference RWE;
  - retrieving data associated with a plurality of RWEs within the predefined distance of the reference RWE, the data comprising social data, spatial data, temporal data and logical data for each of the plural RWEs; and
  - delivering the message when a predefined number of the plural RWEs are within the predefined distance of the reference RWE.

18. The system of claim 17, wherein the predefined number of the plural RWEs is determined based on relationships between the plural RWEs that are within the predefined distance of the reference RWE.

19. The system of claim 17, wherein the predefined number of the plural RWEs is determined based on similarity of states between the plural RWEs.

* * * * *